(12) United States Patent
Mo et al.

(10) Patent No.: US 12,321,252 B2
(45) Date of Patent: Jun. 3, 2025

(54) GENERATING MASSIVE HIGH QUALITY SYNTHETIC OBSERVABILITY DATA

(71) Applicant: International Business Machines Corporation, Armonk, NY (US)

(72) Inventors: Ying Mo, Beijing (CN); Wu Di, Beijing (CN); Xing Tian, Beijing (CN); Qing Zhi Yu, Beijing (CN); Nan Chen, Beijing (CN); Ju Ling Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 18/237,828

(22) Filed: Aug. 24, 2023

(65) Prior Publication Data

US 2025/0068535 A1 Feb. 27, 2025

(51) Int. Cl.
*G06F 11/30* (2006.01)
*G06F 11/34* (2006.01)

(52) U.S. Cl.
CPC ...... *G06F 11/3075* (2013.01); *G06F 11/3457* (2013.01); *G06F 11/3466* (2013.01)

(58) Field of Classification Search
CPC ............. G06F 11/3075; G06F 11/3457; G06F 11/3466
USPC .......................................................... 714/37
See application file for complete search history.

(56) References Cited

U.S. PATENT DOCUMENTS

| 10,956,296 | B2 | 3/2021 | Puri et al. |
| 11,313,994 | B2 | 4/2022 | Salman et al. |
| 11,531,883 | B2 | 12/2022 | Kursun |
| 11,615,208 | B2 | 3/2023 | Truong et al. |
| 2019/0132343 | A1 | 5/2019 | Chen et al. |
| 2020/0090049 | A1* | 3/2020 | Aliper .................... G06N 3/045 |
| 2021/0286923 | A1 | 9/2021 | Kristensen et al. |
| 2022/0012603 | A1* | 1/2022 | Krishnamoorthy ...... G06N 7/01 |
| 2022/0179991 | A1 | 6/2022 | Jha et al. |

FOREIGN PATENT DOCUMENTS

| AU | 2017221777 A1 | 9/2017 |
| EP | 3591586 A1 | 1/2020 |

OTHER PUBLICATIONS

Anonymous, "A System and Method of Synthetic Data Generation for AI Ops Training", ip.com, Aug. 17, 2022.
Marco, R. et al., "Conditional Variational Autoencoder with Inverse Normalization Transformation on Synthetic Data Augmentation in Software Effort Estimation", International Journal of Intelligent Engineering and Systems, Feb. 10, 2022, pp. 366-381, v. 15, No. 3, Japan.

(Continued)

*Primary Examiner* — Yair Leibovich
(74) *Attorney, Agent, or Firm* — Anthony M. Pallone

(57) ABSTRACT

In several aspects for generation of high quality synthetic observability data for computing systems, traces and logs from a system are collected as a seed dataset. Multiple conditional variational autoencoder (VAE) models are trained using the seed dataset for learning association between the traces and the logs. Synthetic traces and logs are generated using the multiple CVAE models while retaining the association between the traces and the logs for the synthetic traces and logs.

20 Claims, 23 Drawing Sheets

(56) References Cited

OTHER PUBLICATIONS

Boutet, R. et al., "Correlate request logs with traces automatically", Datadog, Apr. 16, 2019, pp. 1-8, downloaded Jun. 20, 2023: https://www.datadoghq.com/blog/request-log-correlation/.

Fekete, A., "How to generate synthetic data from real data—zero to hero", Mostly AI, Nov. 28, 2022, 31 pages, downloaded Aug. 23, 2023 from: https://mostly.ai/blog/how-to-generate-synthetic-data.

Dynatrace LLC, "Sensitive data masking (Logs Classic)", Oct. 24, 2022, 12 pages, downloaded Aug. 23, 2023: https://www.dynatrace.com/support/help/observe-and-explore/logs/log-monitoring/log-monitoring-configuration/sensitive-data-masking, United States.

Rathaur, R.S. et al., "Synthetic Observability Data Generation using GANs", AI for Good, Jul. 21, 2021, pp. 1-4, downloaded Jun. 20, 2023: https://aiforgood.itu.int/event/synthetic-observability-data-generation-using-gans-2/.

Gretel AI, "Synthetics", downloaded Aug. 23, 2023 from: https://docs.gretel.ai/reference/synthetics, pp. 1-4, GitBook, United States.

\* cited by examiner

```
{
  "traceId": "6e0c6325",
  "spans": [
    {
      "spanId": "5e7f814b",
      "parentSpanId": null,
      "name": "POST /purchase-order",
      "kind": "REMOTE",
      "startTime": "2023-05-10T10:20:30.123Z",
      "end_time": "2023-05-10T10:20:30.323Z",
      "attributes": {
        "component": "gateway-service",
        "destinationComponent": "orders-service",
        "http.status_code": 200
      },
      "spans": [
        {
          "spanId": "5f87623c",
          "parentSpanId": "5e7f814b",
          "name": "POST /user-verify",
          "kind": "REMOTE",
          "startTime": "2023-05-10T10:20:30.128Z",
          "endTime": "2023-05-10T10:20:30.208Z",
          "attributes": {
            "component": "orders-service",
            "destinationComponent": "users-service",
            "http.status_code": 200
          }
        },
        {
          "spanId": "97a8b231",
          "parentSpanId": "5e7f814b",
          "name": "POST /update-stock",
          "kind": "REMOTE",
          "startTime": "2023-05-10T10:20:30.208Z",
          "end_time": "2023-05-10T10:20:30.288Z",
          "attributes": {
            "component": "orders-service",
            "destinationComponent": "stocks-service",
            "http.status_code": 200
```

FIG. 1A

```
      }
    },
    {
      "spanId": "239f80b0",
      "parentSpanId": "5e7f814b",
      "name": "PRODUCE newOrder",
      "kind": "LOCAL",
      "startTime": "2023-05-10T10:20:30.288Z",
      "endTime": "2023-05-10T10:20:30.323Z",
      "attributes": {
        "component": "orders-service",
        "db.system": "mysql",
        "db.statement": "INSERT INTO orders (ID, Name) VALUES (1, 'Apple')"
      }
    }
  ]
}
```

FIG. 1A (continued)

Tokenized Trace Attributes:
["span_5e7f814b_HTTP_http.status_code=200", "span_5f87623c_HTTP_http.status_code=200", ..., "DB_db.statement=INSERT INTO orders (ID, Name) VALUES (1, 'Apple')"]

| Feed the model by individual log lines, resulting in synthetic log lines in disorder. |
|---|
| [2023-05-10 10:20:30.123] INFO: Transaction 6e0c6325: Processing request 6e0c6325.<br>[2023-05-10 10:20:30.128] INFO: Transaction 6e0c6325: Users service query successful.<br>[2023-05-10 10:20:30.208] DEBUG: Transaction 6e0c6325: Performing users service query.<br>[2023-05-10 10:20:30.323] DEBUG: Transaction 6e0c6325: Sending response. |

| Feed the model by log segment including multiple lines to a trace, keeping log lines in order. |
|---|
| [2023-05-10 10:20:30.123] INFO: Transaction 6e0c6325: Processing request 6e0c6325.<br>[2023-05-10 10:20:30.128] DEBUG: Transaction 6e0c6325: Performing users service query.<br>[2023-05-10 10:20:30.208] INFO: Transaction 6e0c6325: Users service query successful.<br>[2023-05-10 10:20:30.323] DEBUG: Transaction 6e0c6325: Sending response. |

Original Log Lines:
"INFO: Users service query successful "

Tokenized Log Lines:
["INFO:", "Users", "service", "query", "successful"]

Encoded Log Lines Tokens:
[0.2, 0.8, -0.4, 0.6, 0.7]

Collecting, By a Computing Device, Traces and
Logs From a System as a Seed Dataset
310

Training a Plurality of Conditional Variational Autoencoder (VAE) Models
Using the Seed Dataset for Learning Association Between the Traces
and the Logs
320

Generating Synthetic Traces and Logs Using the Plurality of
Conditional VAE Models While Retaining the Association Between the
Traces and the Logs for the Synthetic Traces and Logs

GENERATING MASSIVE HIGH QUALITY SYNTHETIC OBSERVABILITY DATA

BACKGROUND

The present invention relates generally to the field of data generation, and more particularly to generation of high quality synthetic observability data for computing systems.

Monitoring and analyzing the behavior of various services and their interactions in today's distributed systems are crucial for ensuring optimal performance, detecting anomalies and improving overall system reliability. A major challenge in monitoring and analyzing distributed systems is the availability of realistic and diverse observability data, e.g., traces and logs, for troubleshooting and testing purposes. Traditional methods often rely on real-world data collected from production environment that may be limited in quantity, accessibility, or simulated by tooling that may be limited in diversity and quality. Additionally, sensitive data in the collected data may need to be filtered to comply with privacy regulations.

SUMMARY

Embodiments relate to generation of high quality synthetic observability data for computing systems. One embodiment provides a method including collecting, by a computing device, traces and logs from a system as a seed dataset. Multiple conditional variational autoencoder (CVAE) models are trained using the seed dataset for learning association between the traces and the logs. Synthetic traces and logs are generated using the multiple CVAE models while retaining the association between the traces and the logs for the synthetic traces and logs.

A computer system and a computer program product configured to perform the above-described method are also disclosed herein.

These and other features, aspects and advantages of the present embodiments will become understood with reference to the following description, appended claims and accompanying figures.

BRIEF DESCRIPTION OF THE DRAWINGS

FIG. 1A illustrates a sample trace in language-independent data format including four (4) spans;

FIG. 10A illustrates an example of tokenized trace attributes, encoded trace attribute tokens and padded trace attribute tokens, according to some embodiments;

FIG. 10B illustrates a list of one-hot vectors, according to some embodiments;

FIG. 12A illustrates an example of synthetic log lines in disorder after feeding a model by individual log lines, according to some embodiments;

FIG. 12B illustrates an example of feeding a model by log segment including multiple lines to a trace and keeping the log lines in order, according to some embodiments;

FIG. 12C illustrates an example of original log lines and tokenized log lines, according to some embodiments;

FIG. 20 illustrates a process for generation of high quality synthetic observability data for a system, according to some embodiments.

DETAILED DESCRIPTION

Figure 1B:
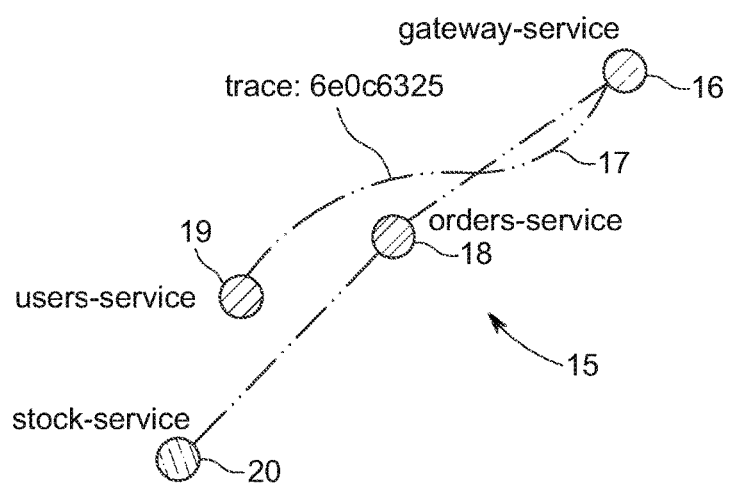
FIG. 1B illustrates a representation of services for a trace.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to generation of high quality synthetic observability data for a system. One embodiment provides a method including collecting, by a computing device, traces and logs from a system as a seed dataset. Multiple conditional variational autoencoder (CVAE) models are trained using the seed dataset for learning association between the traces and the logs. Synthetic traces and logs are generated using the multiple CVAE models while retaining the association between the traces and the logs for the synthetic traces and logs. A computer system and a computer program product configured to perform the above-described method are also disclosed herein.

One or more embodiments significantly improve generating synthetic observability data for a system in a way that reflects how the system behaves in the real world environment and addresses the limitations when using existing synthetic data generation methods and products for the same purpose, which are not well-suited for an observability case, e.g., retaining the association between traces and logs.

One or more of the following features may be included. Some embodiments further include associating logs with corresponding traces based on contextual information and timestamps for providing a comprehensive view on the system behaviors.

One or more embodiments may further include storing the association between the logs and the traces upon the generation of the synthetic traces and logs for capturing characteristics of the seed dataset.

In some embodiments, the generated synthetic traces and logs retain specific anomalies and trace or log characteristics captured in the seed dataset during a monitoring phase.

One or more embodiments may additionally include the feature of training one particular CVAE model of the plurality of CVAE models with a trace category identification (ID) as an additional input to generate the synthetic traces conditioned on specified trace categories.

In some embodiments, the training of the plurality of CVAE models is performed on a per aggregated-service basis with a same trace category ID as the additional input.

One or more embodiments may further include the feature of using a log segment including multiple log lines for a particular trace as input for training a particular model of the plurality of CVAE models such that a sequence of the multiple log lines and correlation are retained upon generating the synthetic log lines.

Some embodiments generate massive synthetic observability data with high quality for distributed (or non-distributed) systems. Such synthetic data should closely resemble some characteristics, patterns and statistical properties of real-world data, enabling comprehensive testing and effective artificial intelligence (AI) models training for anomaly detection for observability solutions. AIOps (Artificial Intelligence for Information Technology (IT) Operations) is an emerging field that leverages AI and machine learning (ML) techniques to enhance IT operation and management.

One or more embodiments provide for leveraging AIOps principles and existing observability solutions capabilities. Utilizing contextual information in the traces and logs collected from a real-world environment, some embodiments introduce a method to learn associations between traces and logs, enabling the generation of synthetic observability data that captures the behavior of target system accurately. Furthermore, one or more embodiments utilize a set of CVAE models to generate synthetic traces and logs. The models are trained on a seed dataset that includes traces and logs collected from real-world, allowing them to learn the underlying patterns and correlations. The use of CVAE models enables the conditioning of traces and logs generation on specified trace categories, preserving the characteristics and anomalies captured in the seed dataset.

Some embodiments provide generation of synthetic observability data for a distributed (or non-distributed) system in a way that reflects how the system behaves in the real world. The system may address the limitations when using existing synthetic data generation methods and products for the same purpose, which are not well-suited for an observability case, e.g., retaining the association between traces and logs. One or more embodiments also address the limitations when using ad hoc methods and solutions that are domain specific and require development efforts. By generating high quality synthetic traces and logs that closely resemble real-world data, some embodiments offer significant advantages for observability products and solutions when dealing with performance testing and model training, meanwhile ensuring data quality, relevance and privacy.

One or more embodiments keep monitoring the customer environment or the lab environment for some time in order to collect a certain number of traces and logs from those services that are involved in these traces to build a seed dataset. Some embodiments group the traces in the seed dataset based on call chains, so that all traces having similar call chains are aggregated into one category. One or more embodiments use contextual information in the traces and logs to build the associations between these traces and logs. Some embodiments use traces in the seed dataset along with the corresponding trace category identifier to train a CVAE model for synthetic trace generation. One or more embodiments use logs associated with the traces in the seed dataset to train multiple CVAE models on a per service basis for synthetic logs generation. Some embodiments use the trained models to generate both the synthetic traces that belong to the specified trace categories and the logs associated with those synthetic traces. One or more embodiments use these generated synthetic traces and logs for different purposes, e.g., used as the test data for product performance testing or train some AI models that the product provides for anomaly detecting, etc.

FIG. 1A illustrates a sample trace 10 in language-independent data format (e.g., JAVASCRIPT® Object Notation (JSON) format) including four (4) spans. The tracing data captured from a distributed system contains information about the execution flow, timing and dependencies between microservices. The tracing data is organized in the form of spans, which represent individual units of work within the system. Each span contains specific attributes, e.g., the operation name, start and end timestamps, and key-value pairs as contextual information. Spans are chained to form the trace, which represents the end-to-end flow of a request or transaction.

FIG. 1B illustrates a representation 15 of services for a trace 17 (trace 6e0c6325). Each span represents either a remote call from one service (e.g., I-service 16, orders-service 18, users-service 19, stocks-service 20) to another, or a local call within the same service. The sample trace 17 is provided herein to demonstrate one or more embodiments.

Figure 1C:
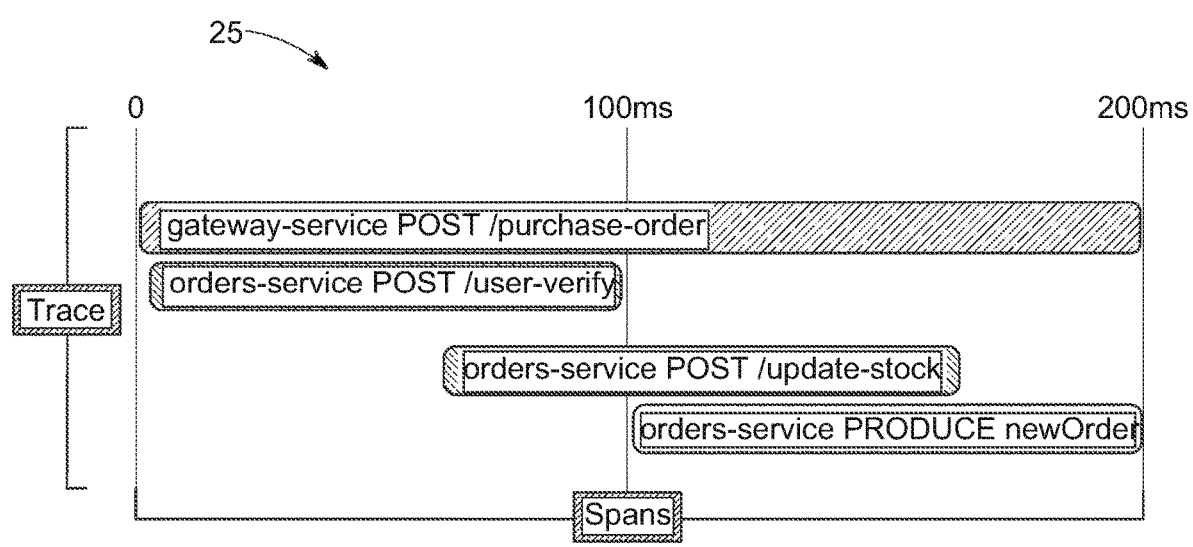
FIG. 1C illustrates a graph of Trace vs. Spans for the sample trace of FIG. 1A and the representation of FIG. 1B.

FIG. 1C illustrates a graph 25 of Trace vs. Spans for the sample trace 17 of FIG. 1A and the representation 15 of FIG. 1B. It should be noted that although some embodiments are presented for distributed systems, one or more embodiments may also be applied in non-distributed systems as long as the system behavior is described by tracing data, just as this sample trace 17 shows as it can describe both remote calls between services and local calls inside a service.

Figure 2:
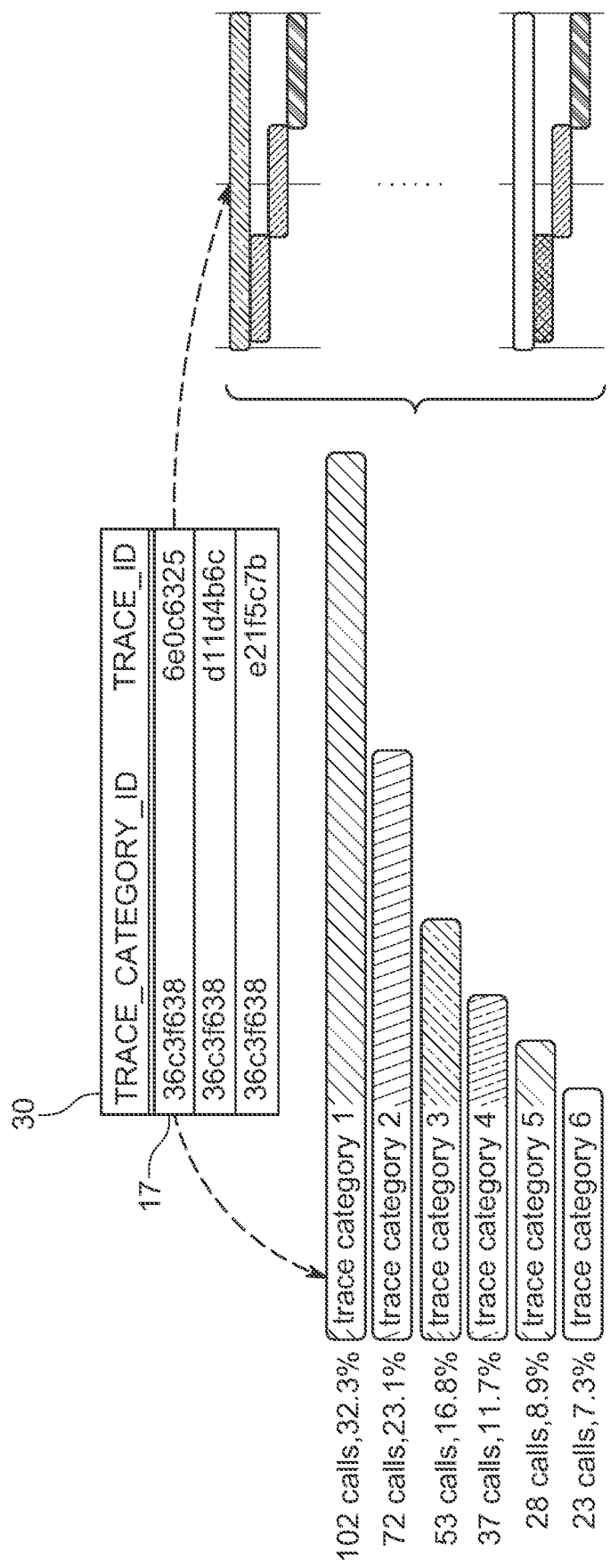
FIG. 2 illustrates a category table with reference to the original traces in a seed dataset, according to some embodiments.

FIG. 2 illustrates a category table 30 with reference to the original traces in a seed dataset, according to some embodiments. Multiple traces may have similar natures, e.g., the number of spans, the service that each span represents, and the way how the spans are organized, although some attributes of these spans can be variant, e.g., trace and span IDs, start and end timestamps, etc. Traces may be aggregated into a single category and assigned with a unique ID. As a pre-process to the seed dataset, the trace aggregation assists to understand the trace structures, their distributions in the seed dataset, and some other statistical properties. In some embodiments, this information is preserved and used when generating synthetic traces and logs to ensure the generated results are much more like the seed dataset. As an example, the following list of trace categories was aggregated from a seed dataset that includes 316 traces, where trace category 1 with its category ID: 36c3f638 has 102 calls, taking 32.3% of the total number of traces, including the trace 17 with ID: 6e0c6325, which is the sample trace previously mentioned in FIGS. 1A-B.

Figure 3:
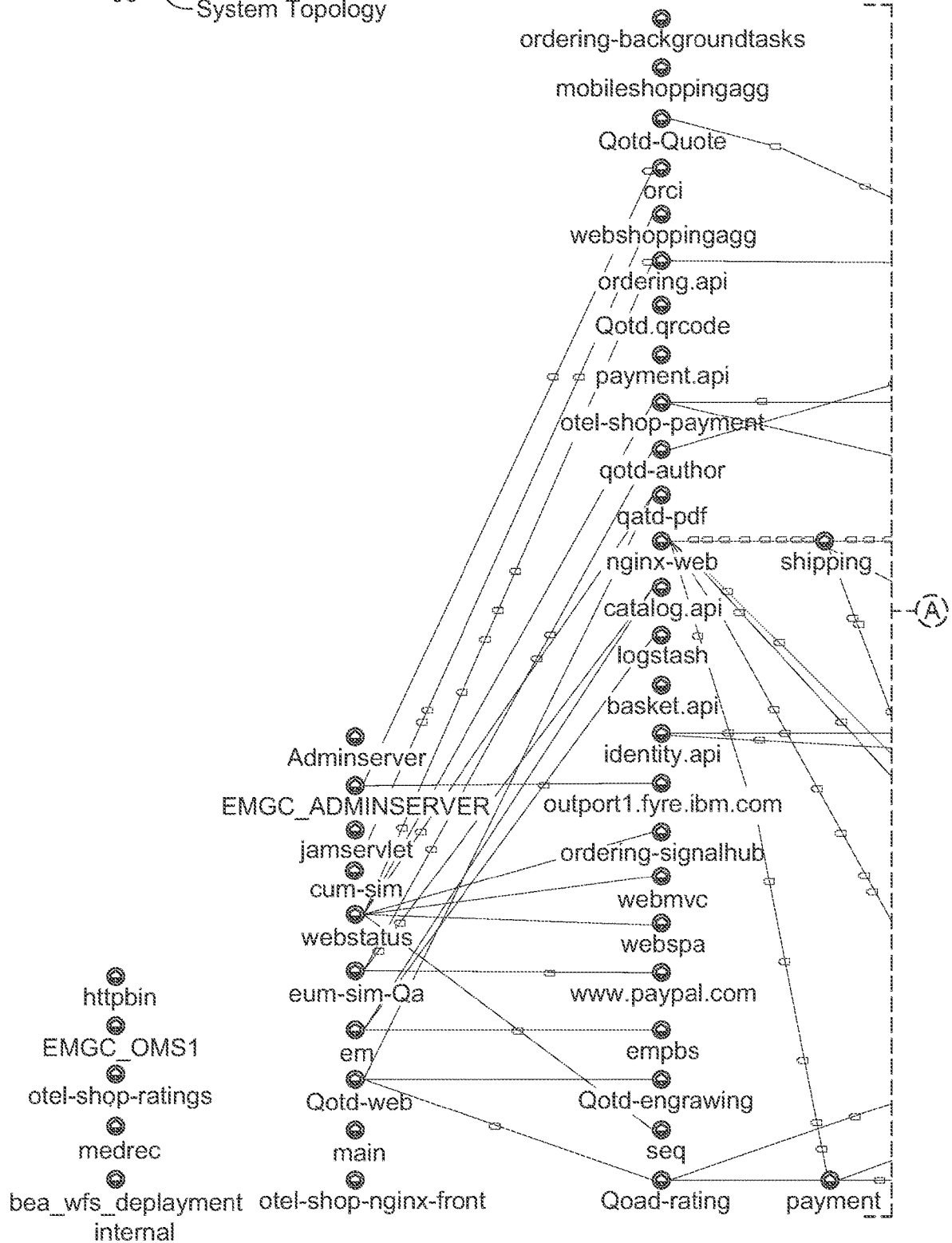
FIG. 3 illustrates a system topology, a trace category table and trace routes with spans and services, according to some embodiments.
Figure 3:
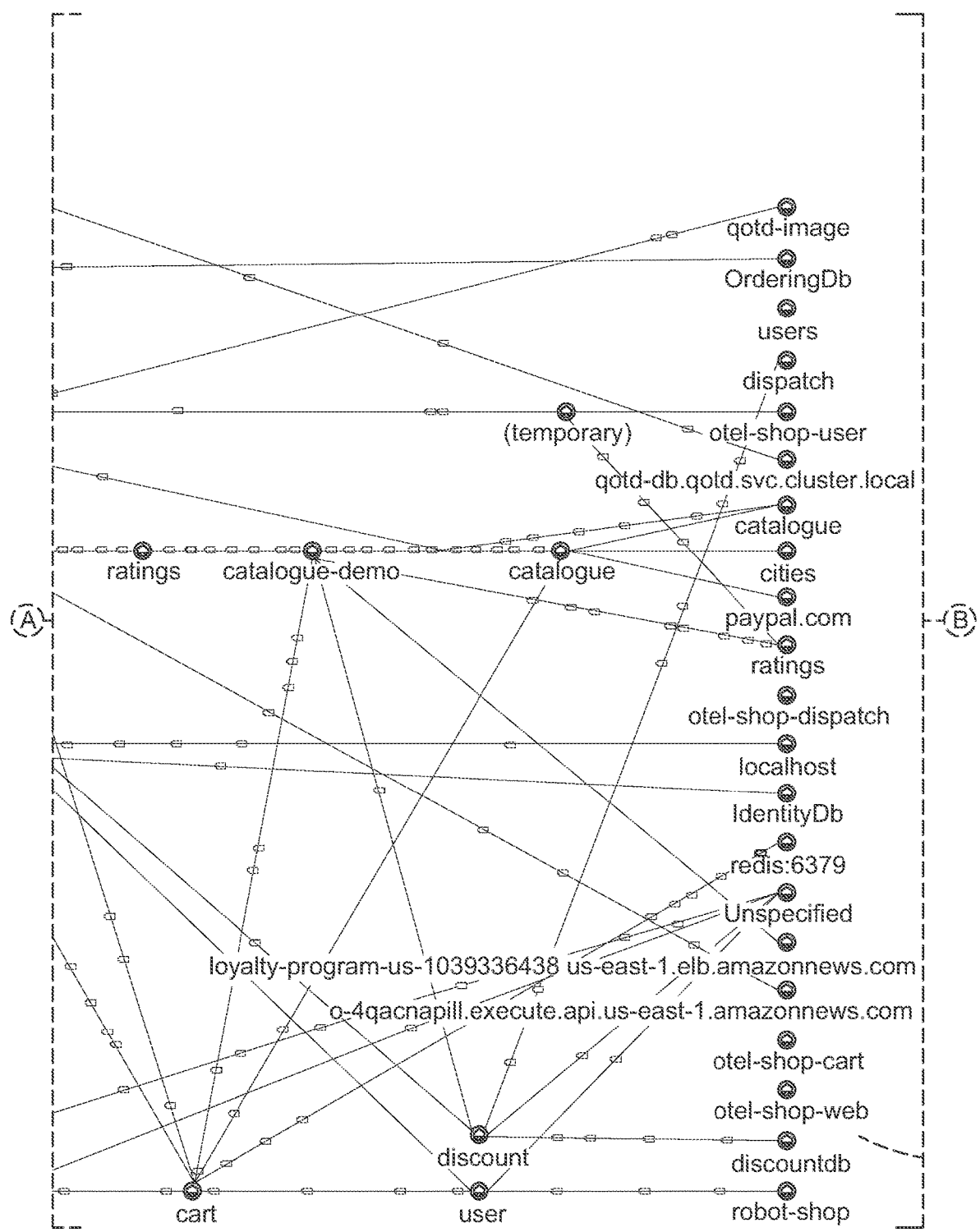
Figure 3:
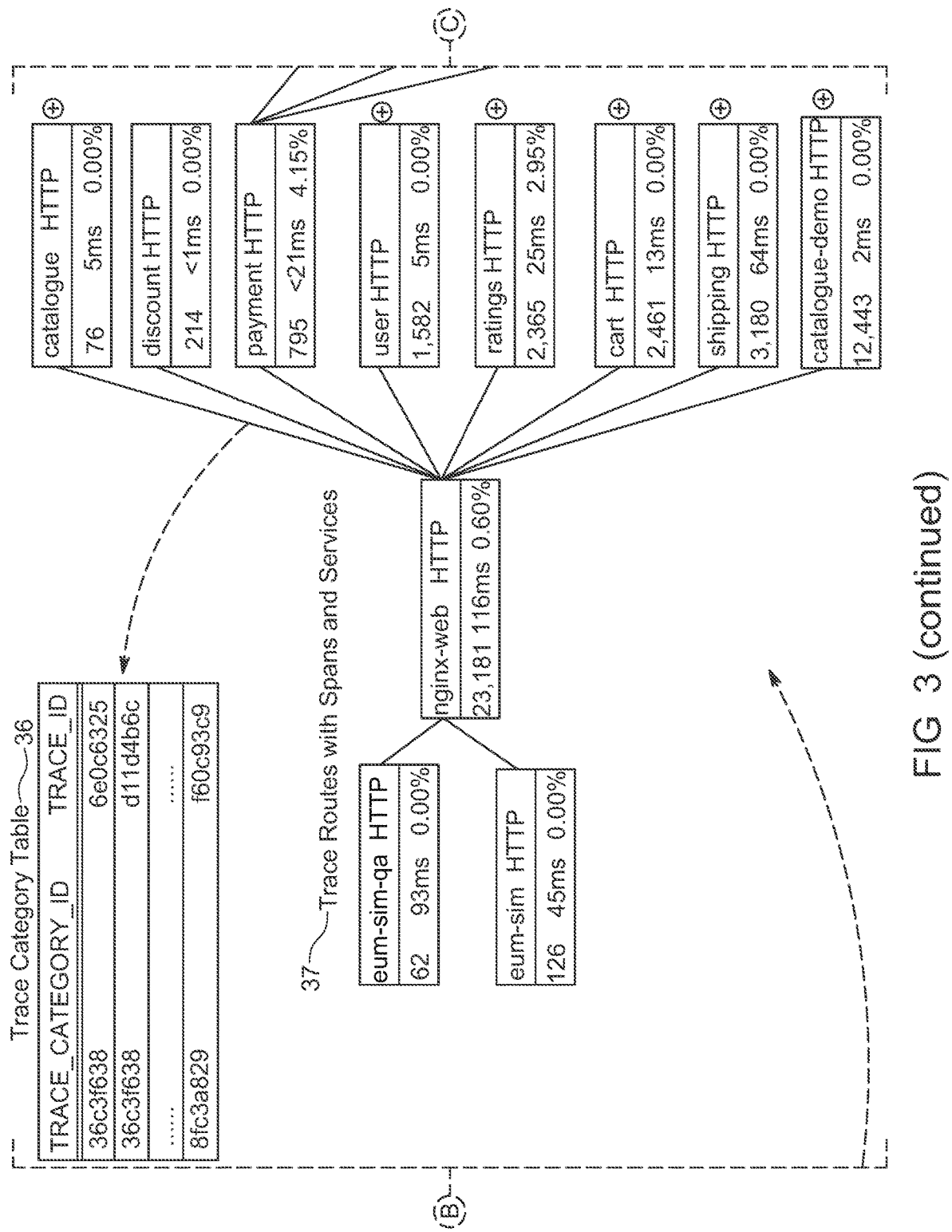
Figure 3:
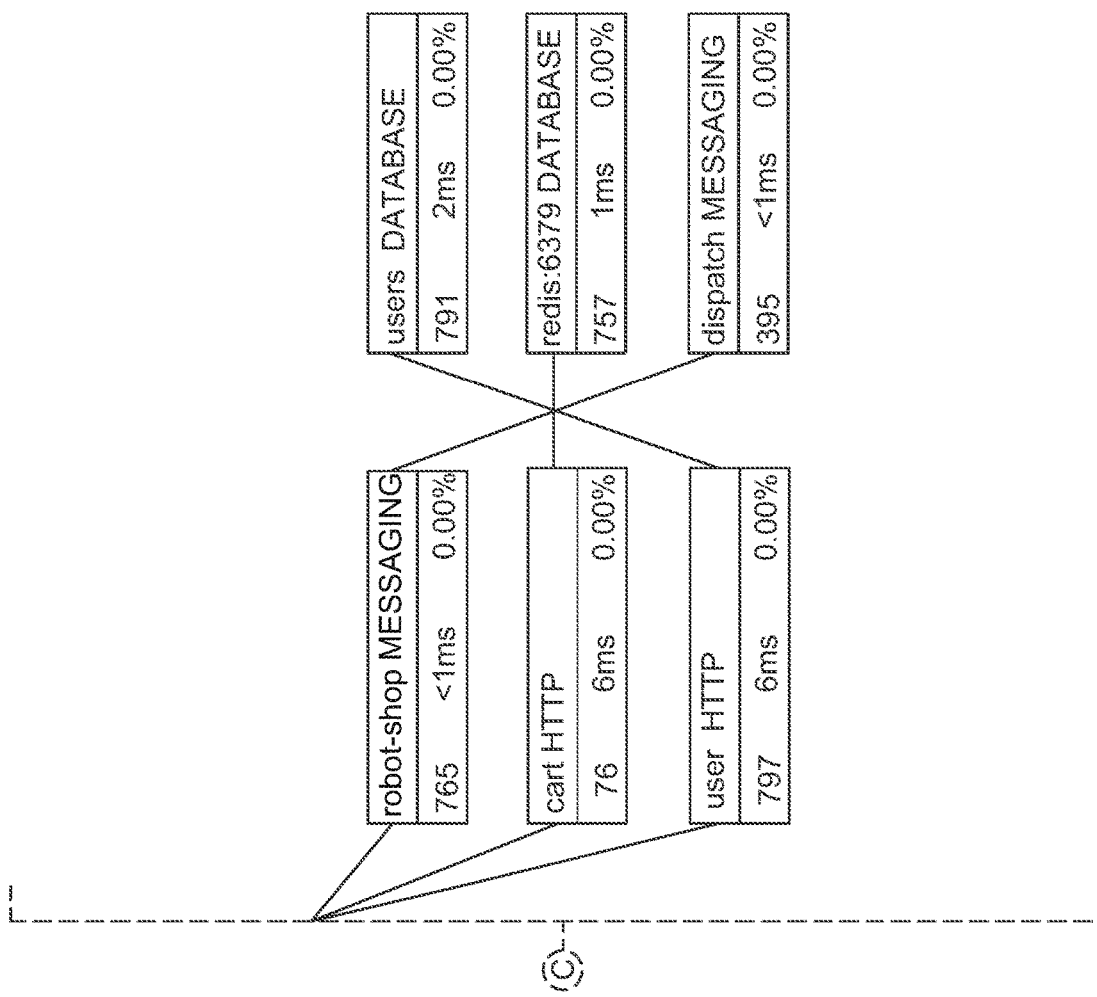
Figure 4:
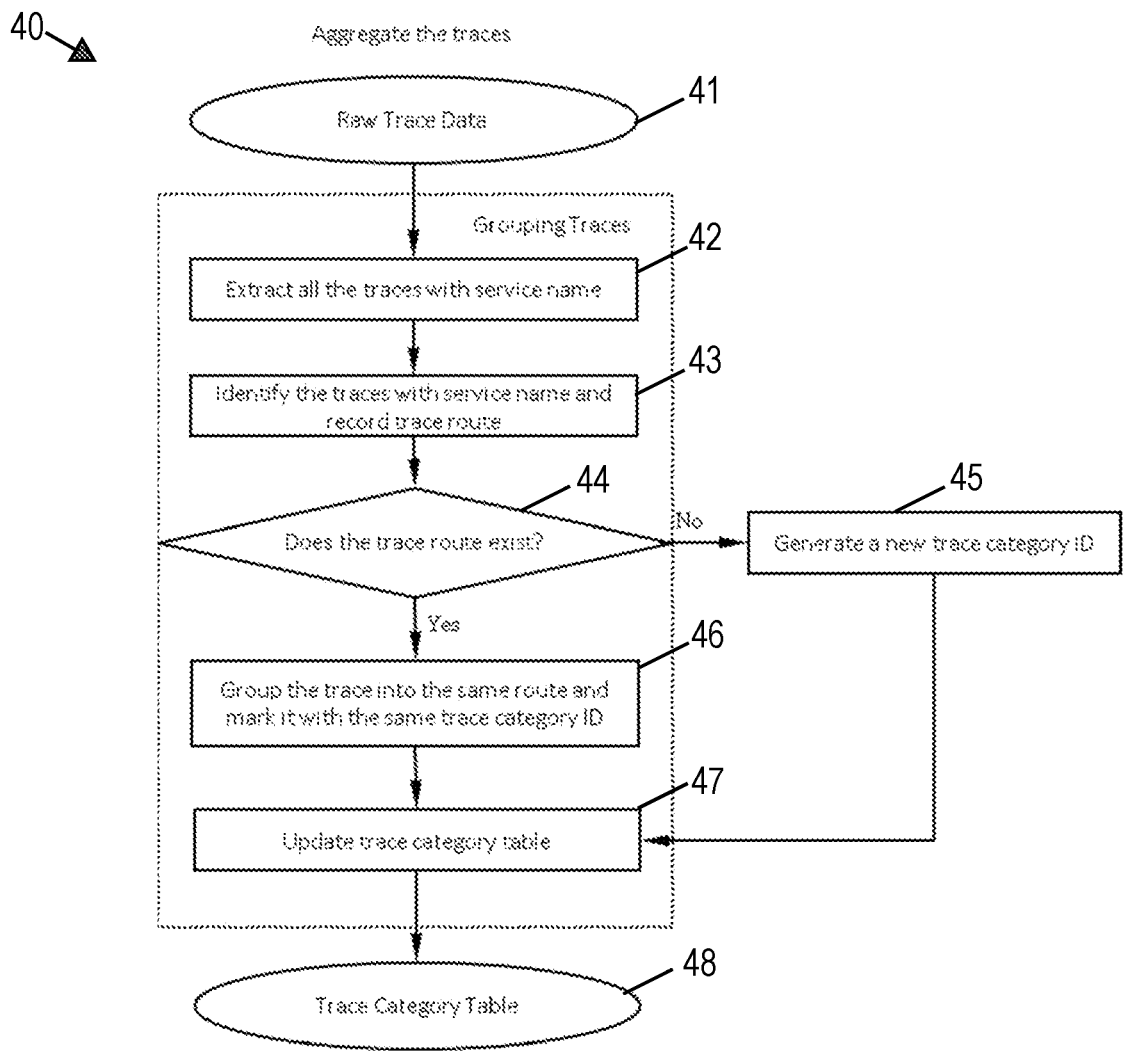
FIG. 4 illustrates a flowchart for aggregation of traces, according to some embodiments.

FIG. 3 illustrates a system topology 35, a trace category table 36 and trace routes with spans and services 37, according to some embodiments. FIG. 4 illustrates a flowchart 40 for aggregation of traces, according to some embodiments. To aggregate the traces, one or more embodiments extract key attributes from multiple raw traces, which are retrieved from a target system. In some embodiments, the raw trace data is entered into the process in block 41. In block 42, all the traces with the service name are extracted. In block 43, the traces with the service name for each span in the trace are identified, and then the trace route with spans are recorded in order, along with the service name to represent the whole trace. In block 44, it is determined whether the trace route exists or not. For each trace, the trace route is used to identify the same traces. If the trace route does not exist in block 44, then the flow proceeds to block 45 where a new trace category ID is generated and the flow proceeds to block 47. Otherwise, the flow proceeds to block 46 where the traces with the same trace route are grouped, the trace category ID is generated for them, and the traces are marked with the same trace category ID. In block 47 the trace category table is updated where the trace category ID and other key trace attributes are stored in the trace category table for the current instance of the trace category table in block 48.

Figure 5:
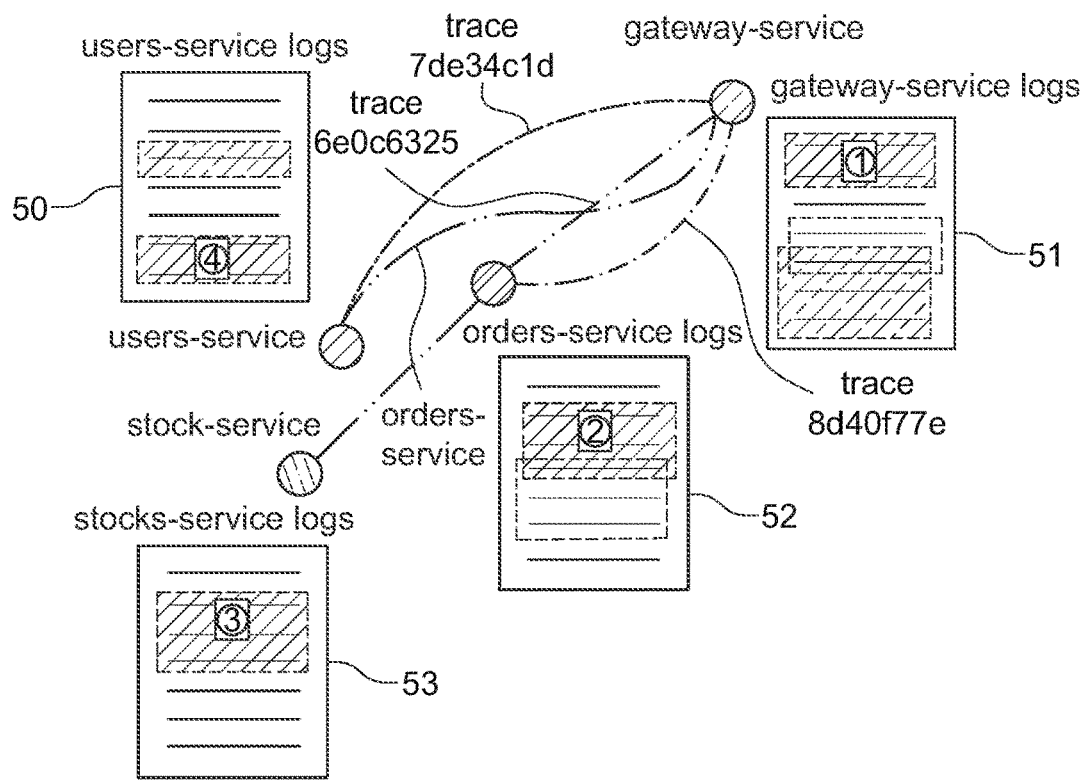
FIG. 5 illustrates an example for demonstrating an association between trace and logs, according to some embodiments.

FIG. 5 illustrates an example for demonstrating an association between a trace and logs (users-service logs 50, gateway-service logs 51, orders-service logs 52 and stocks-service logs 53), according to some embodiments. The execution of a single transaction reflected in a trace often involves multiple services in the distributed system. Throughout the trace 17, each service generates its own log lines. The association between the trace and logs arises from the fact that both the trace and the logs capture different aspects of the same transaction. To better simulate how the system runs when generating synthetic traces and logs, some embodiments learn and preserve such information from the seed dataset.

Figure 6:
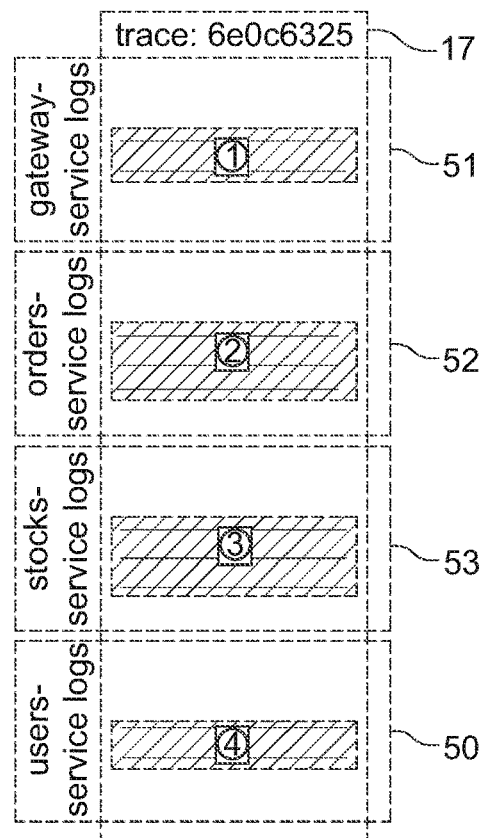
FIG. 6 illustrates an example of service logs for a trace, according to some embodiments.

FIG. 6 illustrates an example of service logs for a trace, according to some embodiments. The system has four (4) services, and three (3) traces are recorded when the system runs. Take the sample trace 17 with ID 6e0c6325. The call chain goes through all four (4) services: gateway-service, users-service, orders-service and stocks-service. Each service prints its own logs when the call on the chain comes to that service. If the system captures and combines all log lines from those services involved in this trace 17, the result is a view of all logs (users-service logs 50, gateway-service logs 51, orders-service logs 52 and stocks-service logs 53) from the different services that are associated.

Figure 7:
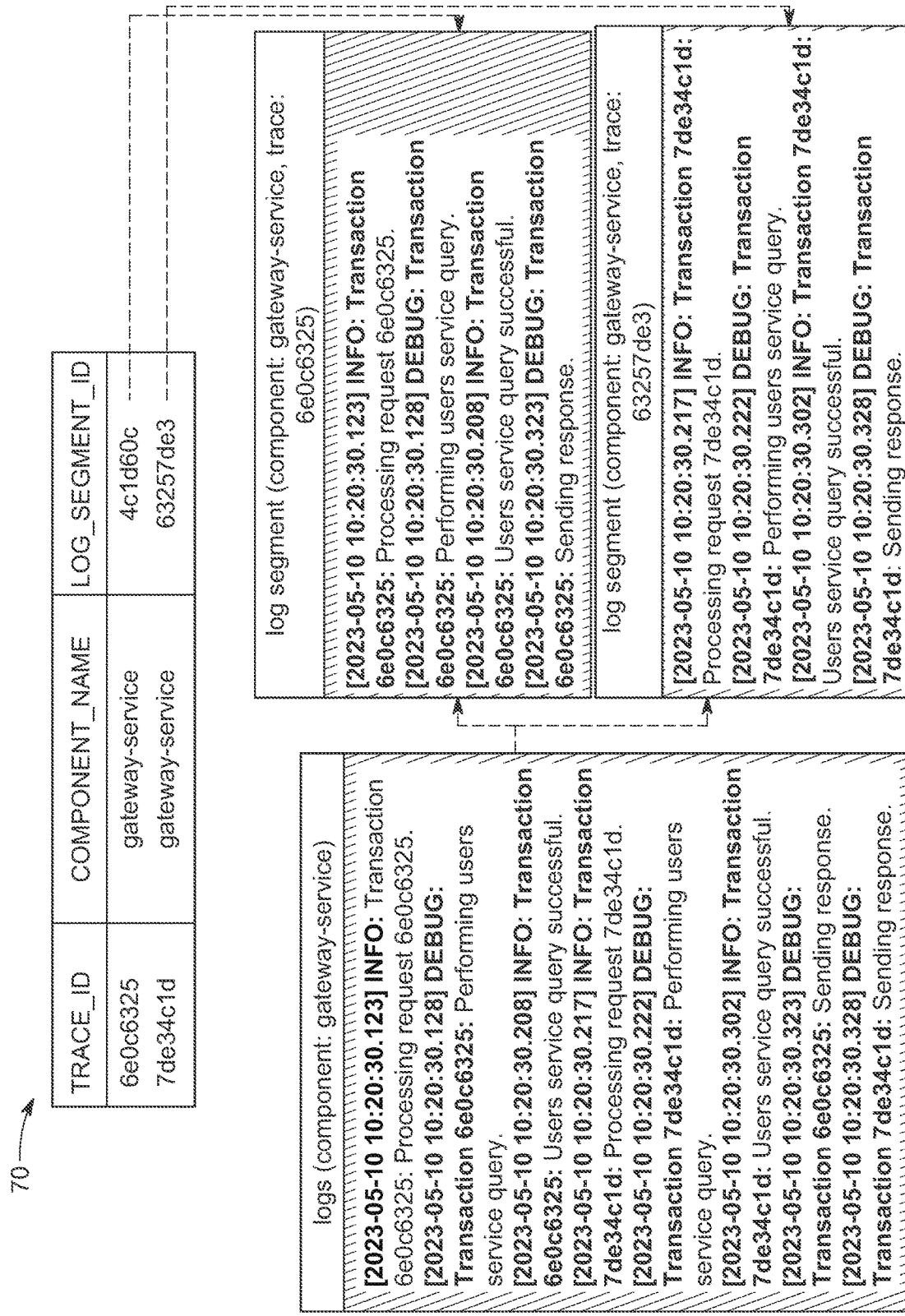
FIG. 7 illustrates log segments for each service and the reference table that records the association between each trace and the corresponding per-service log segments, according to some embodiments.

FIG. 7 illustrates log segments for each service and the reference table 70 that records the association between each trace and the corresponding per-service log segments, according to some embodiments. To build the association between a trace and logs, one or more embodiments define rules to assign log lines to the corresponding trace based on the contextual information within the log lines and the trace. The contextual information may be a request ID, a session ID, a transaction ID, or any other unique identifier associated with the call. By leveraging this identifier, some embodiments find out the trace boundary in logs, and combine the log lines that share the same identifier into a single unit.

As shown, the log lines collected from a gateway-service contain a transaction ID that uniquely identifies each call. Some embodiments build the association between a trace and logs by iterating through the log lines to: identify a transaction ID from logs, e.g., transactions 6e0c6325 and 7de34c1d are found in logs and the traces; segment the log lines based on the transaction ID, which allows the system to separate the log lines into individual segments; and create trace-logs mapping. In one or more embodiments, each log line segment is associated with its corresponding trace based on the transaction ID. The above processing is repeated on all log lines in the seed dataset on a per service basis. The outputs are the log segments for each service and the reference table 70 that records the association between each trace and the corresponding per-service log segments.

Figure 8:
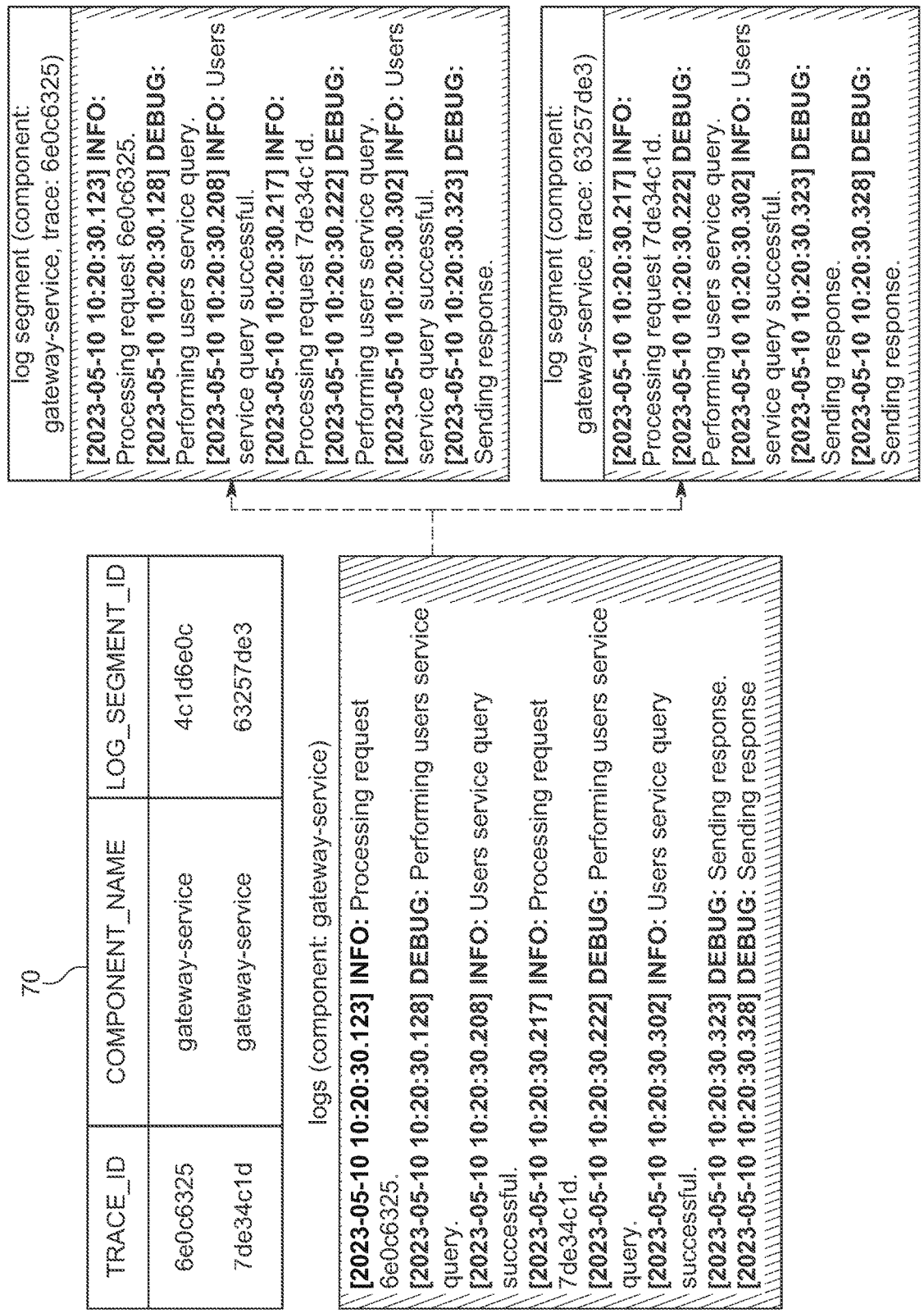
FIG. 8 illustrates processing outputs for log segments for each service and the reference table that records the association between each trace and the corresponding per-service log segments, according to some embodiments.

FIG. 8 illustrates processing outputs for log segments for each service and the reference table 70 that records the association between each trace and the corresponding per-service log segments, according to some embodiments. Since logs are unstructured data when comparing with a trace, some log lines may not include a transaction ID, or any similar unique identifier associated with the call. One or more embodiments add timestamps as complementary to the contextual information when generating the trace-log association. By considering timestamps, the system may correlate log lines to the corresponding trace that occurs in the same time window. For a service, after the logs are filtered by those log lines that have transaction IDs, the system continues to build the association based on timestamps by iterating through the log lines to: extract the timestamps from log lines and define fixed time windows around the log lines based on traces begin and end timestamps; segment the log lines by grouping the log lines between the begin and end timestamps for each trace, which helps identify sets of log lines that are likely associated with the same trace because they occur within the same time window sequentially; and create trace-logs mapping. Some embodiments associate each log line segment with its corresponding trace based on the timestamp range.

It should be noted that only relying on timestamps may be insufficient when multiple traces have log lines with overlapped time windows. In that case, an additional approach may be needed to distinguish log lines between different traces. In one or more embodiments, the focus here is to generate synthetic data, which does not require 100% accuracy. Therefore, taking timestamps as complementary to the contextual information to build the association is adequate. The above process is repeated on all log lines in the seed dataset on a per service basis. The outputs are the log segments for each service and the reference table 70 that records the association between each trace and the corresponding per-service log segments.

Figure 9A:
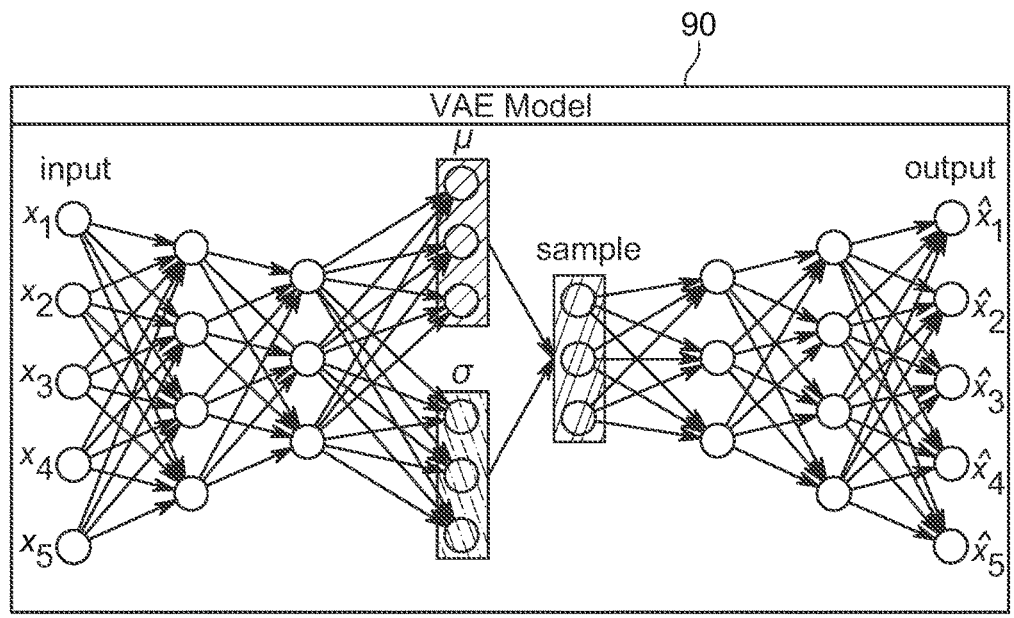
FIG. 9A illustrates a representation for a variational autoencoder (VAE) model.

FIG. 9A illustrates a representation 90 for a variational autoencoder (VAE) model. A VAE is a type of deep learning model that can generate synthetic data. A VAE model works by learning a compressed representation of the input data, called a latent space, and then generates new data by sampling from this latent space; the encoder network in the VAE maps the input data to a distribution in the latent space with a mean and a standard deviation; and the decoder network takes samples from the latent space distribution and reconstructs the data.

Figure 9B:
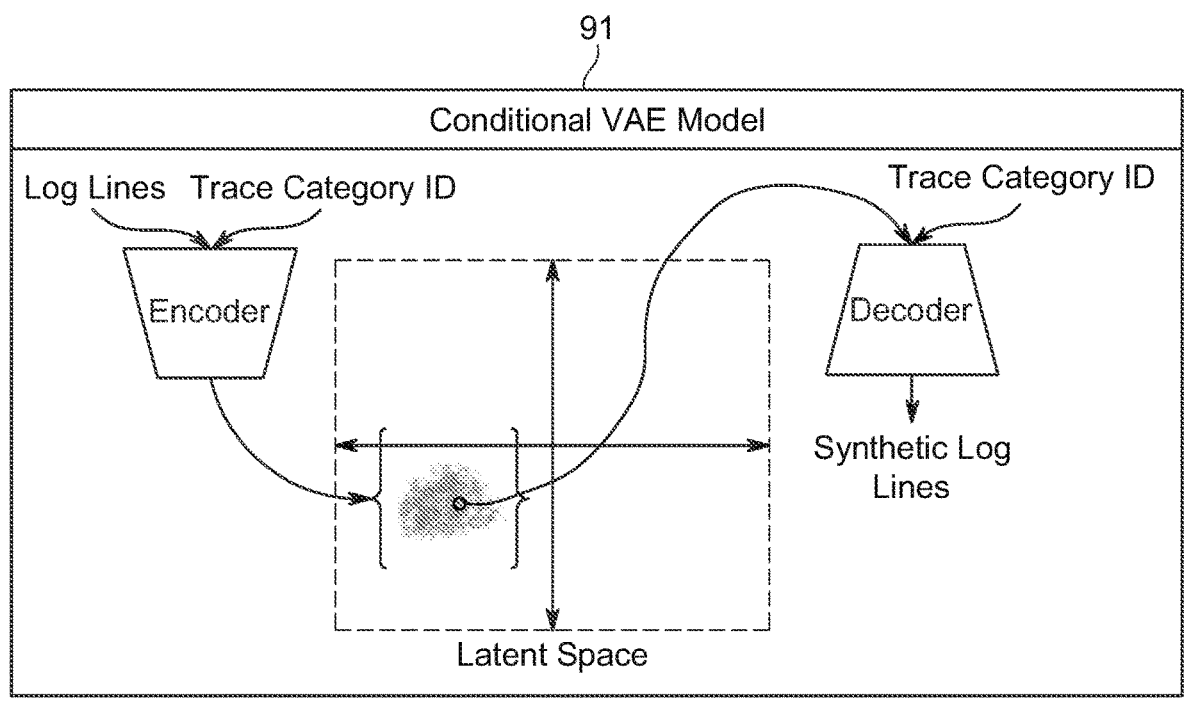
FIG. 9B illustrates a representation for a conditional VAE (CVAE) model, according to some embodiments.

FIG. 9B illustrates a representation 91 for a CVAE model, according to some embodiments. In one or more embodiments, a VAE is utilized with some optimization to generate the synthetic traces and logs. By training a VAE model on the seed dataset, the model learns the patterns, correlations, and statistical properties of the traces and logs collected, allowing to the system to generate new traces and logs that resemble the original data. Moreover, to ensure each time that the log lines are generated by one VAE model always belong to the same trace generated by another VAE model. Instead of using a traditional VAE model, some embodiments use a CVAE model, which allows the generation of new samples conditioned on a specific input condition. In CVAE models, additional conditional information is provided as input to both an encoder and a decoder. During the encoding process, the conditional information is concatenated with input data and fed into the encoder to help encode both the input data and the conditional information into a latent representation as the basis for sampling from the latent space. Also, during the decoding process, the vector sampled from latent space and the conditional information are concatenated and fed into the decoder to reconstruct the input data, which allows for controlled and targeted generation of samples based on desired conditions.

FIG. 10A illustrates an example 160 of tokenized trace attributes, encoded trace attribute tokens and padded trace attribute tokens, according to some embodiments. Because a trace is structured data, most of its characteristics, e.g., the way how its spans are organized, can be fixed. The system only needs to introduce a little variation into trace attributes when generating a synthetic trace per the original trace from the seed dataset. For a trace ID begin and end timestamps, the system does not want them to be generated completely randomly, as that would break the association between the synthetic trace and the corresponding synthetic logs. In some embodiments, the system rebuilds this association after the model generates the synthetic results by resetting the trace ID, the begin and the end timestamps. Take the sample trace 17 (FIGS. 1A-B, 2 and 6) as an example, in order to pre-process the trace attributes before training, the following is performed: the system picks up the attributes desired to be variant including both name and value to build a token array; the system encodes the tokens into numerical sequences as an array of numbers where each number corresponds to a unique word in a vocabulary; and the system pads the encoded sequences for this trace along with those from other traces to a fixed length to ensure they have the same length.

FIG. 10B illustrates a list 161 of one-hot vectors, according to some embodiments. Along with the encoded trace attributes, the system also needs to feed the trace category to the CVAE model. In one or more embodiments, this is performed by encoding the trace category ID to a one-hot vector. By going through all trace categories in the seed dataset, the system can build a list 161 of one-hot vectors as described below, where the category (ID: 36c3f638) of our sample trace 17 (ID: 6e0c6325) maps to one of the vectors, e.g., [1, 0, 0, 0, 0, . . . , 0, 0]. After all the above work is completed, one or more embodiments feed both the encoded trace attributes and the trace category one-hot vector to the CVAE model to start the training. The decoded sequences are converted back to text at later time, resulting in the generated synthetic traces. For CVAE model training on a trace, the CVAE model and the training process are very efficient since the system only encoded a very small amount of data.

Figure 11A:
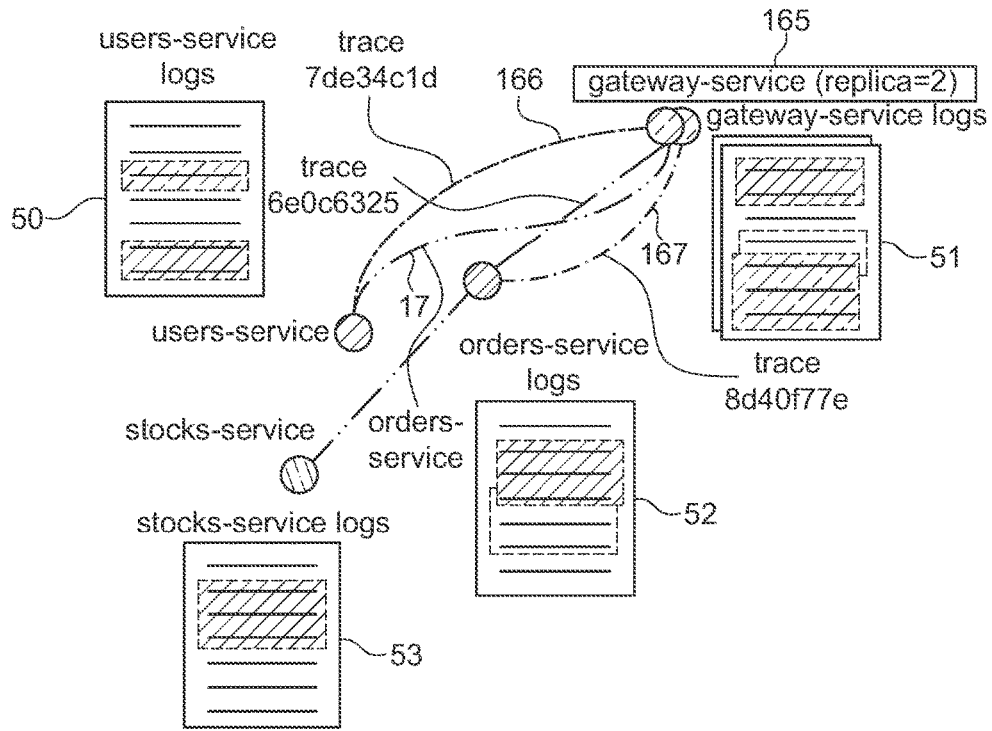
FIG. 11A illustrates representation for services and service logs, according to some embodiments.
Figure 11B:
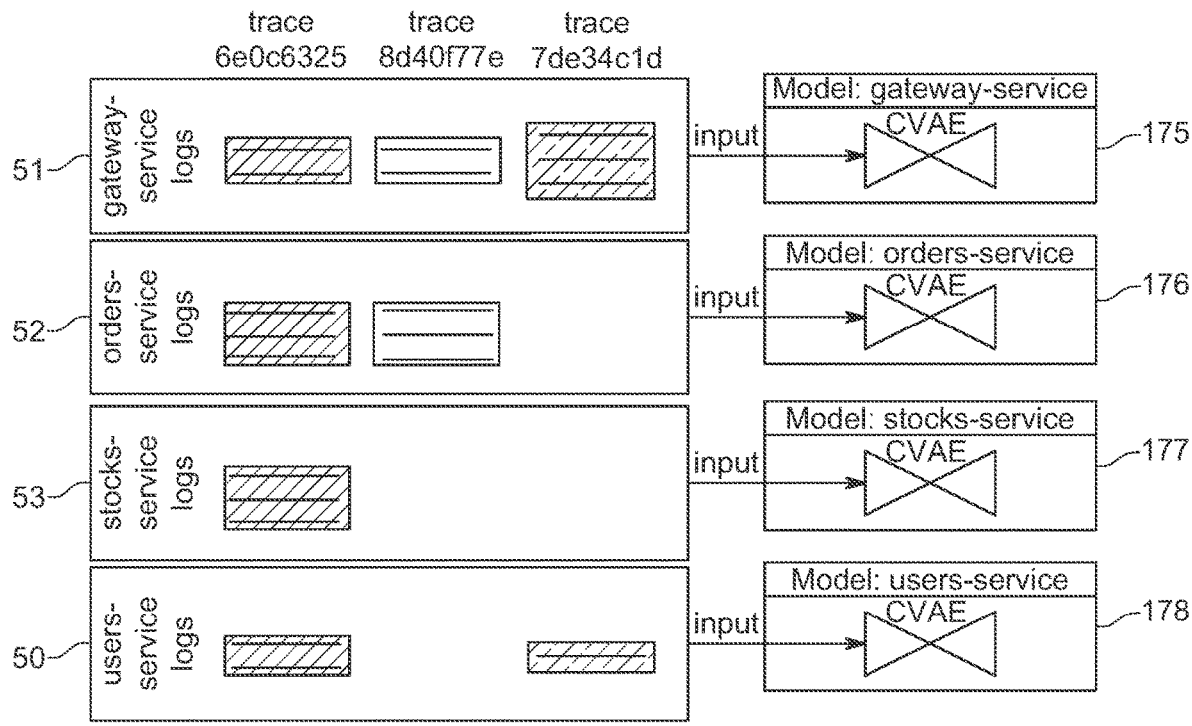
FIG. 11B illustrates aggregation of service logs for a single model, according to some embodiments.

FIG. 11A illustrates representation for services and service logs (users-service logs 50, gateway-services log 51, orders-service logs 52 and stocks-service logs 53), according to some embodiments. FIG. 11B illustrates aggregation of service logs for a single CVAE model, according to some embodiments. Since a log is another type of data that is different from a trace (e.g., traces 17, 166, 167), in one or more embodiments, a separate CVAE model is used to train on the logs. Multiple CVAE models exist and each CVAE model maps to one service because, generally in a distributed system, each service produces logs with its own characteristics. If multiple services produce similar logs and exhibit common patterns, some embodiments aggregate these logs from multiple services to train a single CVAE model, e.g., gateway-service 165 has two (2) replicas, therefore, each of their logs may be combined and fed into one CVAE model. As shown, for the gateway-service logs 51, multiple service logs for multiple traces are aggregated for training the CVAE model 175. For the orders-service logs 52, multiple service logs for multiple traces are aggregated for training the CVAE model 176. For the stocks-service logs 53, a service log for trace 17 is used for training the CVAE model 177. For the users-service logs 50, multiple service logs for multiple traces are aggregated for training the CVAE model 178.

FIG. 12A illustrates an example 180 of synthetic log lines in disorder after feeding a CVAE model by individual log lines, according to some embodiments. For each service that is aggregated for optimization, the system trains the CVAE model on logs, which can be summarized as described below. Given a trace category, specified by the category ID, the system traverses through all traces from the seed dataset that belong to this category, based on the association between the trace and the corresponding log lines that were built in previous processing; the system finds all log segments which are associated with this trace; and the system feeds each log segment, usually including multiple log lines, to the CVAE model for the corresponding service. As an example, the sample trace (ID: 6e0c6325) belongs to a trace category (ID: 36c3f638). The trace (ID: 6e0c6325) has four (4) log segments that cover all the four (4) services in this distributed system throughout the call chain. In some embodiments, the system feeds each of the log segments to the corresponding CVAE model for each of the four (4) services. If feeding each log line directly to the CVAE model, all synthetic log lines are independently generated by the CVAE model. This loses a lot of important information, e.g., the log lines sequential order and the context to a certain trace. By combining multiple log lines to a segment as a single unit that is specific to a trace and feeding the segment to the CVAE model, the CVAE model learns all of that information, which in turn is retained when the CVAE model generates the synthetic logs.

FIG. 12B illustrates an example 181 of feeding a CVAE model by log segment including multiple lines to a trace and keeping the log lines in order, according to some embodiments. FIG. 12C illustrates an example 182 of original log lines and tokenized log lines, according to some embodiments. When feeding log segment to the CVAE model, the trace category represented by the one-hot vector (similarly as performed when training the CVAE model for a trace) also is concatenated to the numerical encoded log segment vector as additional input to the CVAE model. This helps ensure the association between a trace and a log segment is learned by the CVAE model and retained when generating synthetic traces and logs. For the pre-processing of log lines, it is very similar to what is processed with a trace. The only difference is that log lines need to be tokenized first since logs are unstructured data, i.e., splitting the log lines into individual tokens, after then they are transformed into numerical representations.

Figure 13:
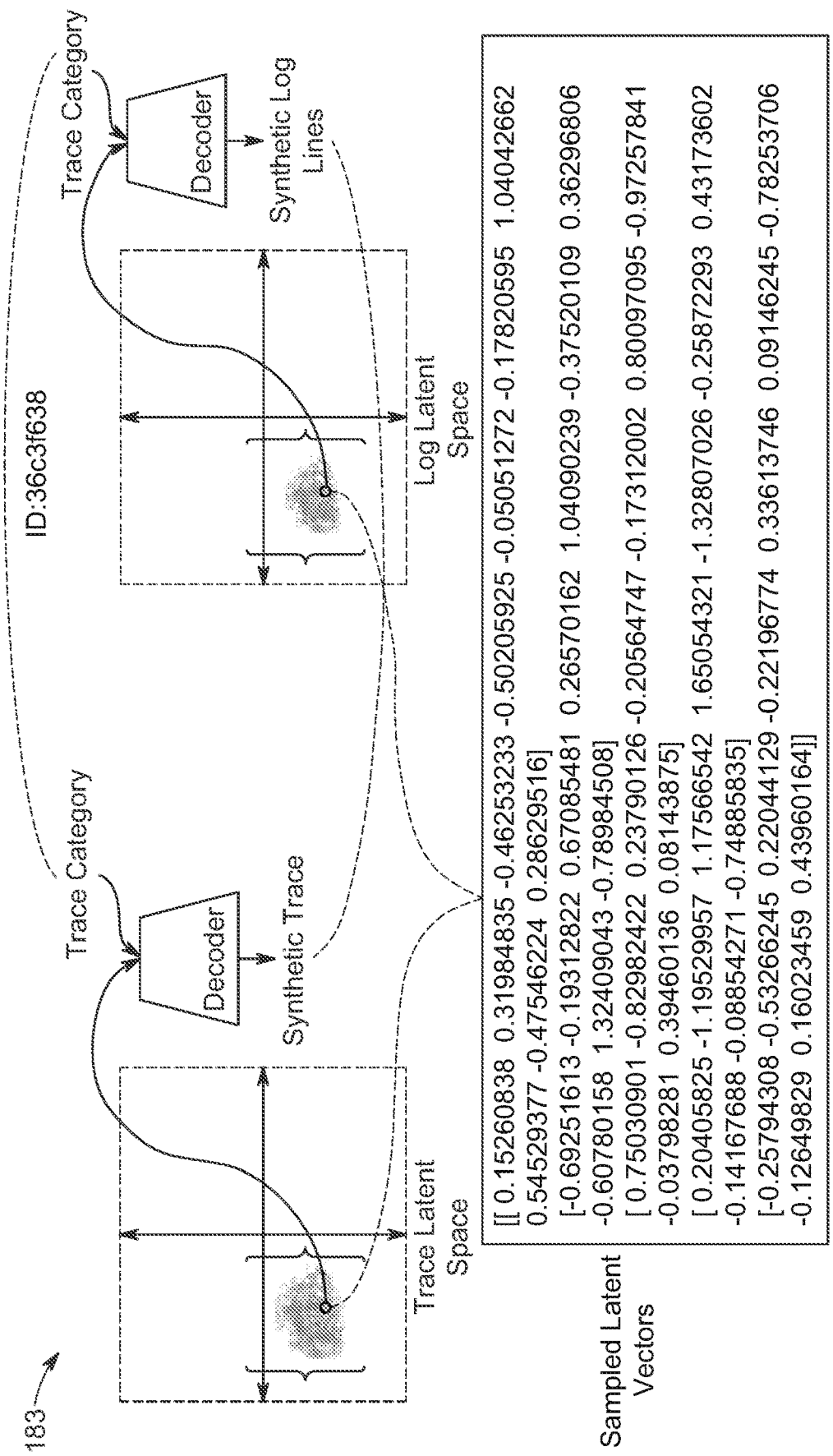
FIG. 13 illustrates an example showing how a pair of synthetic trace and log lines is generated, according to some embodiments.

FIG. 13 illustrates an example 183 showing how a pair of synthetic trace and log lines is generated, according to some embodiments. After all CVAE models are trained, the system generates both the synthetic traces and logs by the trained CVAE models, which can be performed by the following. In one or more embodiment, the system drops use of the encoders from all the CVAE models as it does not need them during the generating phase. The system generates synthetic traces by iteratively sampling from the latent space of the trace CVAE model. For each iteration, the system generates a random latent vector, then appends the trace category ID as a one-hot vector encoded into the latent vector. This conditional latent vector combines the random variation from the latent space with the specific trace information. The system further generates synthetic log lines from the latent space of the per-service log model and uses the same trace category ID as the additional input, such that the generated trace and the log lines are associated with each other. In one or more embodiments, some post process work is needed to complete the synthetic trace and log lines, e.g., to fill the trace ID and timestamp information. As an example, to demonstrate how a pair of synthetic trace and log lines is generated, there are two latent vectors sampled from trace and log latent spaces separately that are biased to the condition controlled by a trace category, ID: 36c3f638. This makes the generated synthetic trace and log lines associated.

Figure 14:
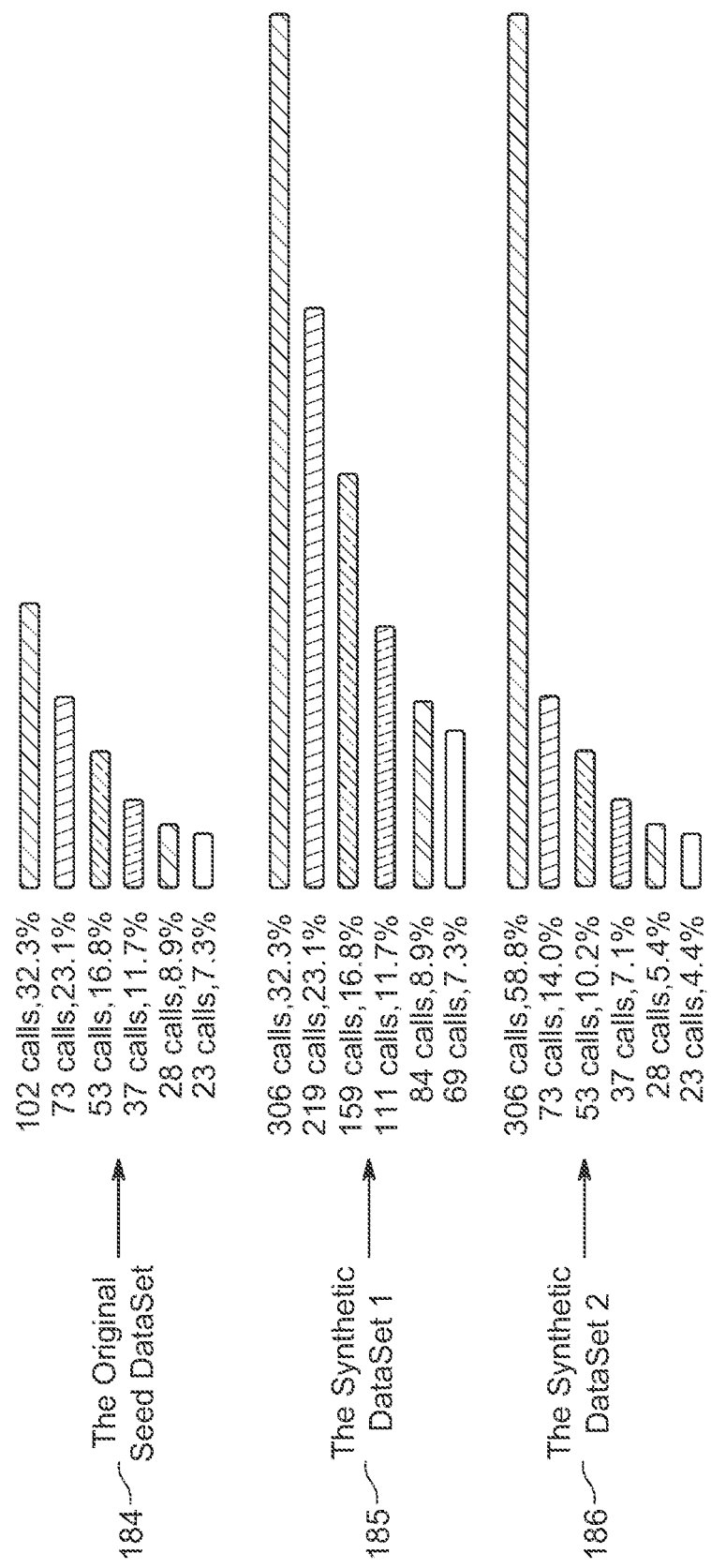
FIG. 14 illustrates examples to demonstrate how the synthetic dataset may be used in different scenarios, according to some embodiments.

FIG. 14 illustrates examples to demonstrate how the synthetic dataset may be used in different scenarios, according to some embodiments. Instead of generating every single trace and log line independently that lose a lot of contextual information, by conditioning the traces and logs generation on given trace category, the synthetic traces and logs are generated in a way that much better reflects how the system actually runs. Because of this, the synthetic data can not only be used for performance tests that usually require massive test data but can also be used in some more advance scenarios that require test data with much higher quality, e.g., AI model training with large scaled data set for anomaly detecting and customer problem troubleshooting by simulating customer environment with the same level of data scale. The examples (original seed dataset 184, synthetic dataset 1 185 and synthetic dataset 2 186) can be used to demonstrate how the synthetic dataset can be used in different scenarios: Synthetic dataset 1 185 can be used to increase the size of the dataset to a desired extent without changing trace distribution to simulate the customer environment for general performance testing and Synthetic dataset 2 186 can be used to increase the number by a specific type of trace for a particular customer problem troubleshooting.

Figure 15:
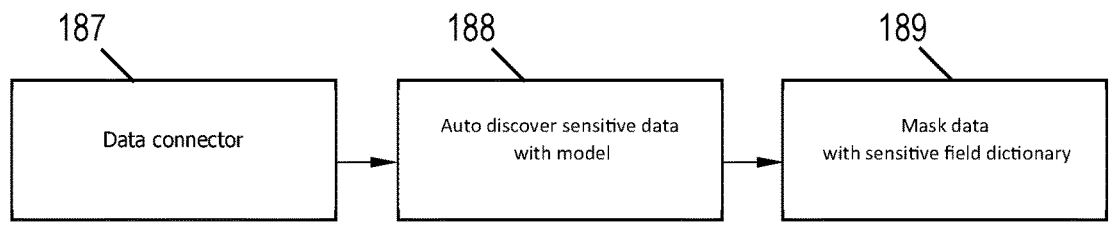
FIG. 15 illustrates a flow diagram for sensitive data masking, according to some embodiments.

FIG. 15 illustrates a flow diagram for sensitive data masking, according to some embodiments. There can be sensitive data in traces and logs in a seed dataset if they are collected from customer environment. If so, in one or more embodiments, data masking is required to protect sensitive data without security issue. In some embodiments, data masking is proceeded as an optional and configurable pre-processing for the seed dataset by following below process. The data connector processing 187 connects to physical data. The auto discover sensitive data with model processing 188 scans the content and discovers sensitive data with machine learning techniques. The mask data with sensitive field dictionary processing 189 hashes or masks discovered sensitive data. Sample sensitive data may include: login credentials, username, password, server address, universal resource locator (URL), port number, secret key and key hash, infrastructure-access key, credit-card number, phone number, social-security number, contact information, filename, etc.

Figure 16:
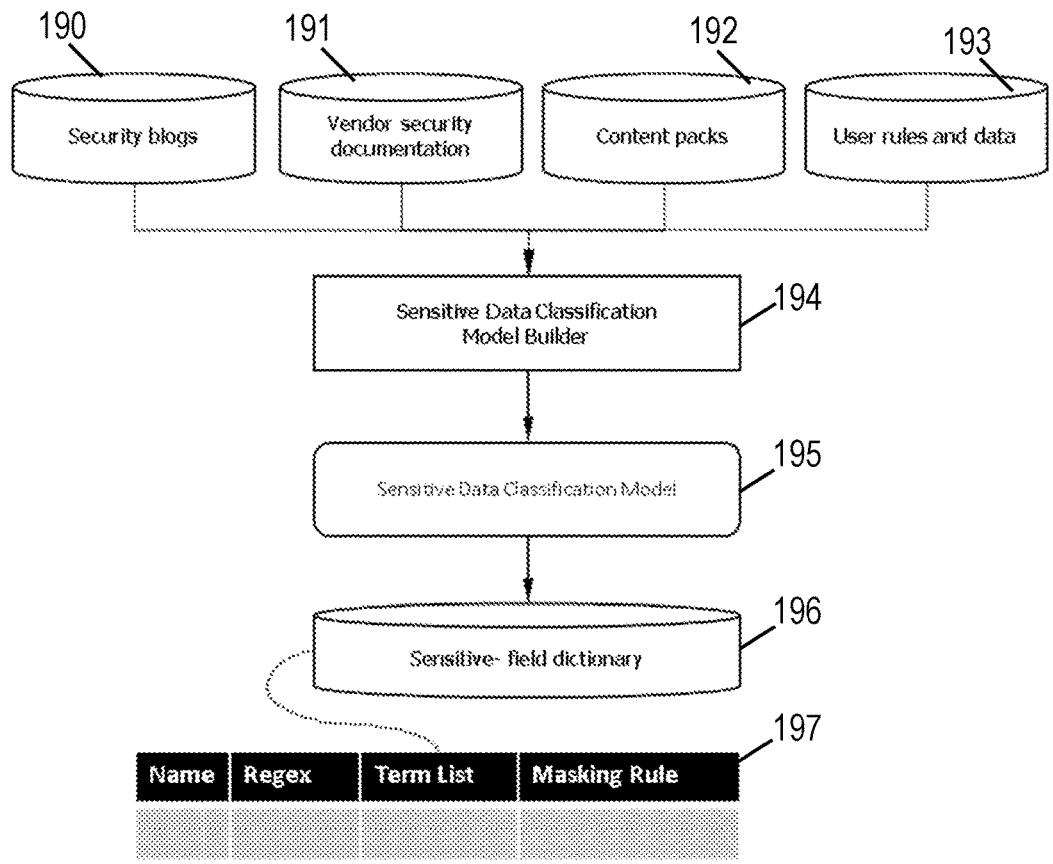
FIG. 16 illustrates a flow diagram for identifying sensitive data using machine learning technique, according to some embodiments.

FIG. 16 illustrates a flow diagram for identifying sensitive data using machine learning technique, according to some embodiments. Rule-based identification and masking of sensitive fields in logs currently exist in log systems, but it is not efficient. There are some conventional techniques to train machine learning components to automatically identify and mask the fields with sensitive data. One or more embodiments leverage the conventional techniques to identify and mask fields with sensitive data. To identify sensitive data using one or more machine learning techniques, the following is performed as described below. In some embodiments, the training data is generated from various data sources including: descriptions of sensitive fields in security blogs 190; various types of vendor security documentation 191; content packs 192 provided by vendors of log subsystems; and traditional log rules in rule-based masking methods via user rules and data 193. The sensitive data classification model builder block 194 builds a sensitive data classification model with the training data. The context information is used to train the sensitive data classification model 195. The sensitive field dictionary 196 is generated by the sensitive data classification model 195. The sensitive field dictionary 196 is then used to identify and mask sensitive data in logs or traces using a table 197 that includes fields for at least: name, regex (regular expression), term list and masking rule.

Figure 17:
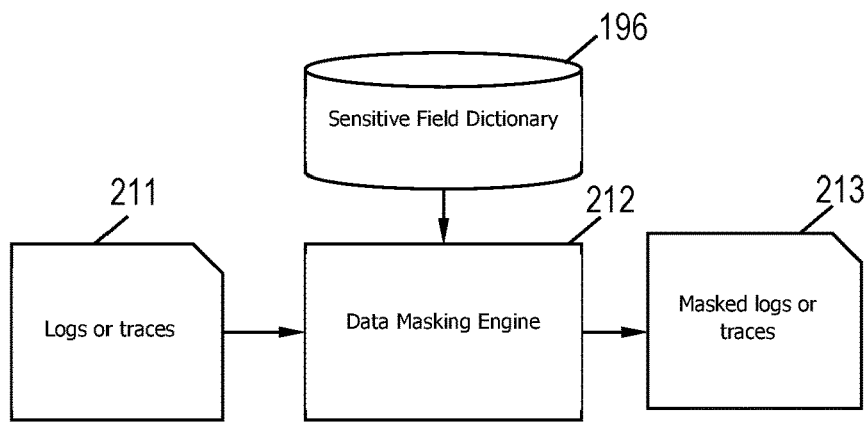
FIG. 17 illustrates a flow diagram for applying a generated dictionary to mask data, according to some embodiments.

FIG. 17 illustrates a flow diagram for applying a generated dictionary to mask data, according to some embodiments. The sensitive field dictionary 196 is then applied to identify and mask sensitive data in logs or traces 211 using the data masking engine 212. After that, the logs and traces 211 become masked logs or traces 213 and are securely protected without sensitive data being exposed.

Figure 18:
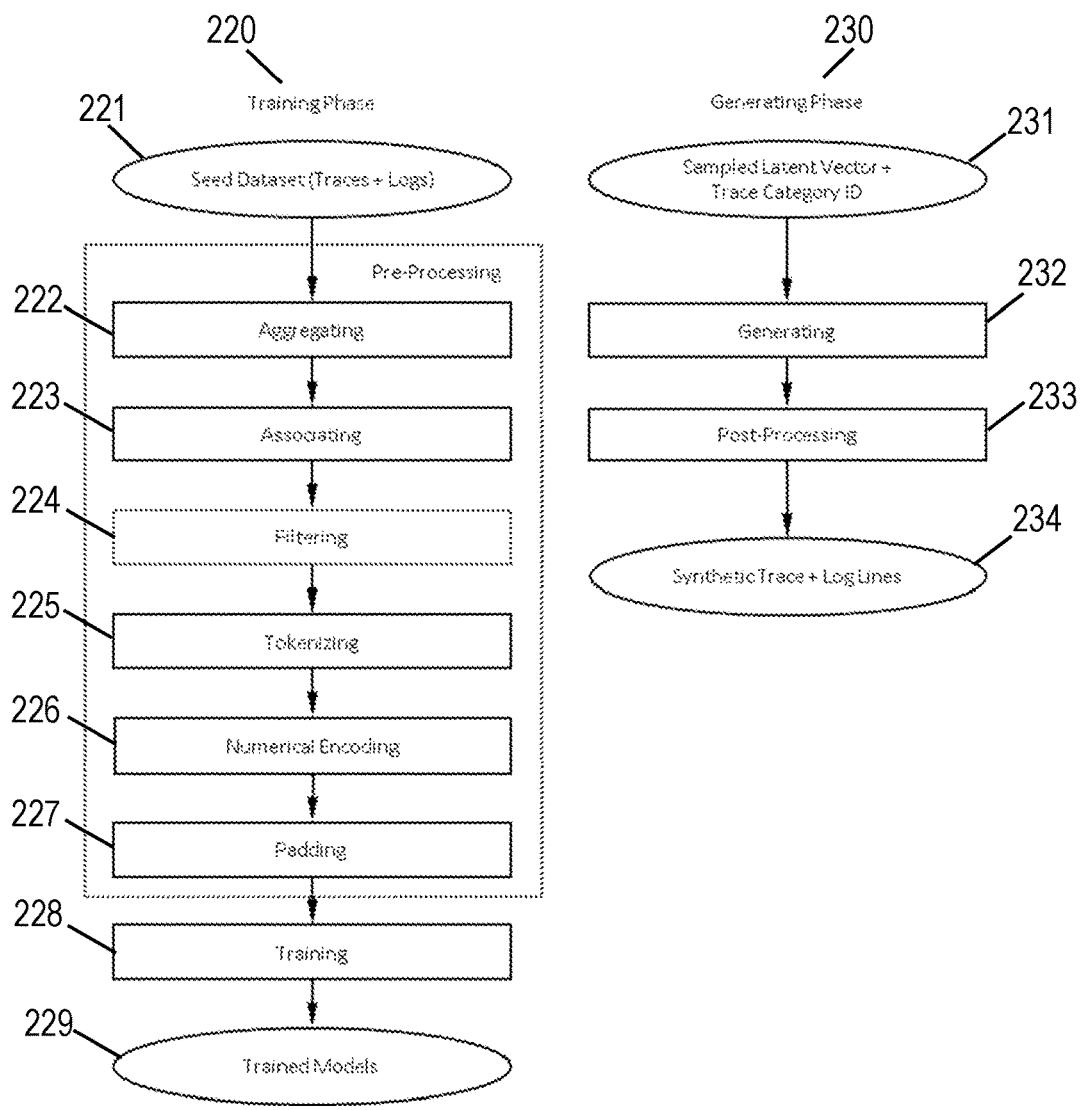
FIG. 18 illustrates flow diagrams for showing how observability data are processed when training the models and generating the synthetic traces and logs, according to some embodiments.

FIG. 18 illustrates flow diagrams for showing how observability data are processed when training the models (training phase 220) and generating the synthetic traces and logs (generating phase 230), according to some embodiments. The overall data processing flow is described as follows. In one or more embodiments, in the training phase 220, the seed dataset 221 including traces and logs are collected from a target system by using typical monitoring approaches. The dataset is pre-processed before it is fed to the models as described below. In block 222, the system aggregates the traces per category and the log lines per service, where multiple services having the same nature may be aggregated further. In block 223, the system performs associating by building the association between the trace and logs. In block 224, the system may perform optional filtering that filters user privacy information if data is collected from a customer environment or this processing may be skipped if it is a non-customer environment. In block 225, the system performs tokenizing to split selected trace attributes and log lines to multiple tokens. In block 226, the system performs numerical encoding to encode all the tokens into numerical sequences. In block 227, the system performs padding to pad the encoded sequences to a fixed length. After the pre-processing portion is finished, the encoded trace attributes and log segments along with the encoded trace category IDs are fed into CVAE models for training in block 228, which results in the trained models 229.

In some embodiments, in the generating phase 230, the sampled latent vectors and the (encoded) trace category ID 231 from the latent space of the trained models 229 are randomly picked up, along with the encoded trace category ID 231 as the input to the trained models 229 to generate the synthetic trace and log lines in the generating block 232. These generated outputs are post-processed in the post-processing block 233 to fill trace ID and timestamp information before they are returned to the end user as synthetic trace and log lines 234.

Figure 19:
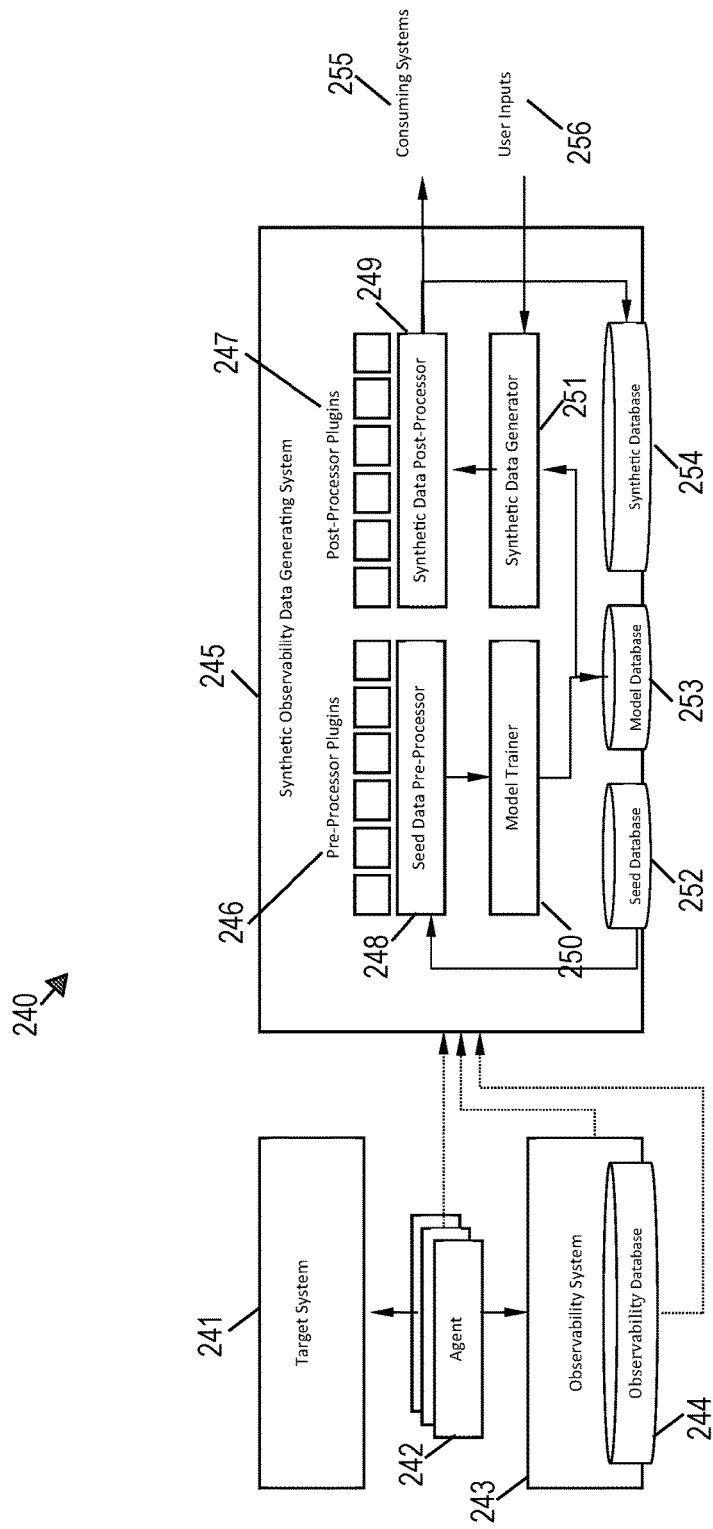
FIG. 19 illustrates a system architecture, according to some embodiments.

FIG. 19 illustrates a system 240 architecture, according to some embodiments. This reference system 240 architecture is used to demonstrate how the system works with a target system 241. The seed dataset can typically be collected by an existing observability system 243, e.g., it can be collected by asking the agents 242 to send data directly to the system, scraping observability system 243 proactively, or dumping from observability database 244 directly. The seed dataset is stored in seed database 252 and read by the seed data pre-processor 248 when training a model. The seed data pre-processor 248 may support a pluggable architecture so the data processing logic may be customized, e.g., a plugin (pre-processor plugins 246) to filter user privacy information may be optionally added to the processing chain. The seed data pre-processor 248 results are fed into the model trainer 250 for model training, and the trained model is stored into the model database 253.

In some embodiments, when generating synthetic data, in the synthetic observability data generating system 245, the synthetic data generator 251 reads the trained model from model database 253 with user inputs 256, e.g., the expected target data size, to guide the data generation. The results created by synthetic data generator 251 are fed into the synthetic data post-processor 249 for any further post-processing, e.g., to fill the trace ID and timestamp information. The synthetic data post-processor 249 may also support a pluggable architecture so the data processing logic may be customized when needed (using post-processor plugins 247). The generated synthetic data is stored into the synthetic database 254, which may be dumped and consumed by consuming systems later (an offline mode) or returned right after it is generated and consumed by consuming systems 255 immediately (an online mode).

FIG. 20 illustrates a process 300 for generation of high quality synthetic observability data for a system, according to some embodiments. In one embodiment, in block 310, process 300 performs collecting, by a computing device, traces and logs from a system as a seed dataset. In block 320, process 300 performs training multiple CVAE models using the seed dataset for learning association between the traces and the logs. In block 330, process 300 performs generating synthetic traces and logs using the plurality of CVAE models while retaining the association between the traces and the logs for the synthetic traces and logs. Thus, process 300 achieves learning associations between traces and logs, enabling the generation of synthetic observability data that captures the behavior of target system accurately. By using CVAE models, the embodiments enable the conditioning of traces and logs generation on specified trace categories, preserving the characteristics and anomalies captured in the seed dataset. Process 300 contributes to the advantage of generating synthetic observability data for a system in a way that reflects how the system behaves in the real world environment and addresses the limitations when using existing synthetic data generation methods and products for the same purpose, which are not well-suited for an observability case, e.g., retaining the association between traces and logs.

Process 300 further contributes to the advantage of realistic performance testing by generating massive number of synthetic traces and logs that closely resemble real-world data. This enables accurate, comprehensive performance testing against observability products, or solutions, ensuring their ability to handle diverse scenarios. Process 300 additionally contributes to the advantage of effective AI model training. The synthetic traces and logs serve as valuable training data for AI models. By preserving contextual information and associations between traces and logs, the generated data can capture the system's behavior and patterns, leading to improved AI model accuracy over conventional systems in observability products or solutions. Process 300 still further contributes to the advantage of an efficient generation process by using CVAE models that enable efficient and controlled generation of synthetic traces and logs. These CVAE models take trace category identifiers into consideration, ensuring that the generated data reflects specific trace categories accurately. Process 300 additionally contributes to the advantage of preserved trace and log correlations by accurately associating log lines with their corresponding trace, maintaining the correlations observed in real-world system, and allowing comprehensive understanding of system behavior and dependencies between services. Still further, process 300 contributes to the advantage of scalable and customizable data generation by supporting scalable generation of synthetic traces and logs by employing global and per-service models. The models enable customization, which facilitates the creation of specific trace categories and log characteristics. Still further yet, process 300 further contributes to the advantage of data privacy and security by incorporating data protection rules including secure data connection, auto-discovery of private data, data masking techniques, ensuring compliance with data privacy regulations and safeguards sensitive information when generating synthetic traces and logs.

In one or more embodiments, process 300 may include the feature of associating logs with corresponding traces based on contextual information and timestamps for providing a comprehensive view on the system behaviors.

In some embodiments, process 300 may further include the feature of storing the association between the logs and the traces upon the generation of the synthetic traces and logs for capturing characteristics of the seed dataset.

In one or more embodiments, process 300 may further include the feature that the generated synthetic traces and logs retain specific anomalies and trace or log characteristics captured in the seed dataset during a monitoring phase.

In some embodiments, process 300 may include the feature of training one particular CVAE model of the plurality of CVAE models with a trace category identification (ID) as an additional input to generate the synthetic traces conditioned on specified trace categories.

In one or more embodiments, process 300 may further include the feature that the training of the plurality of CVAE models is performed on a per aggregated-service basis with a same trace category ID as the additional input.

In some embodiments, process 300 may additionally include the feature of using a log segment including multiple log lines for a particular trace as input for training a particular model of the plurality of CVAE models such that a sequence of the multiple log lines and correlation are retained upon generating the synthetic log lines.

One or more embodiments revolutionizes high quality synthetic observability data generating, which includes traces and logs, providing compelling business case and value proposition for products and solutions in the observability market as follows. Some embodiments provide accelerated time-to-market by streamlining observability data generation, enabling AI model development and deployment inside the observability products and solutions much faster. Some embodiments unlock the potential of AIOps with a synthetic data solution. One or more embodiments provide cost reduction and resource optimization by eliminating the costly observability data collection process, and optimizing the resource utilization for the evolving of observability products and solutions. Some embodiments provide improved observability solution performance by generating high quality observability data for enhanced accuracy and operational efficiency when dealing with customer problems using observability products and solutions. One or more embodiments additionally provide customization and adaptability by allowing users to tailor synthetic observability data generation to support specific scenarios when dealing with variant problems in real-world using observability products and solutions. Field teams and customers have very strong and urgent requirements on observability products and solutions' quality and performance, which can be effectively addressed by generating synthetic observability data for performance testing, model training, as well as problem solving by one or more embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 21:
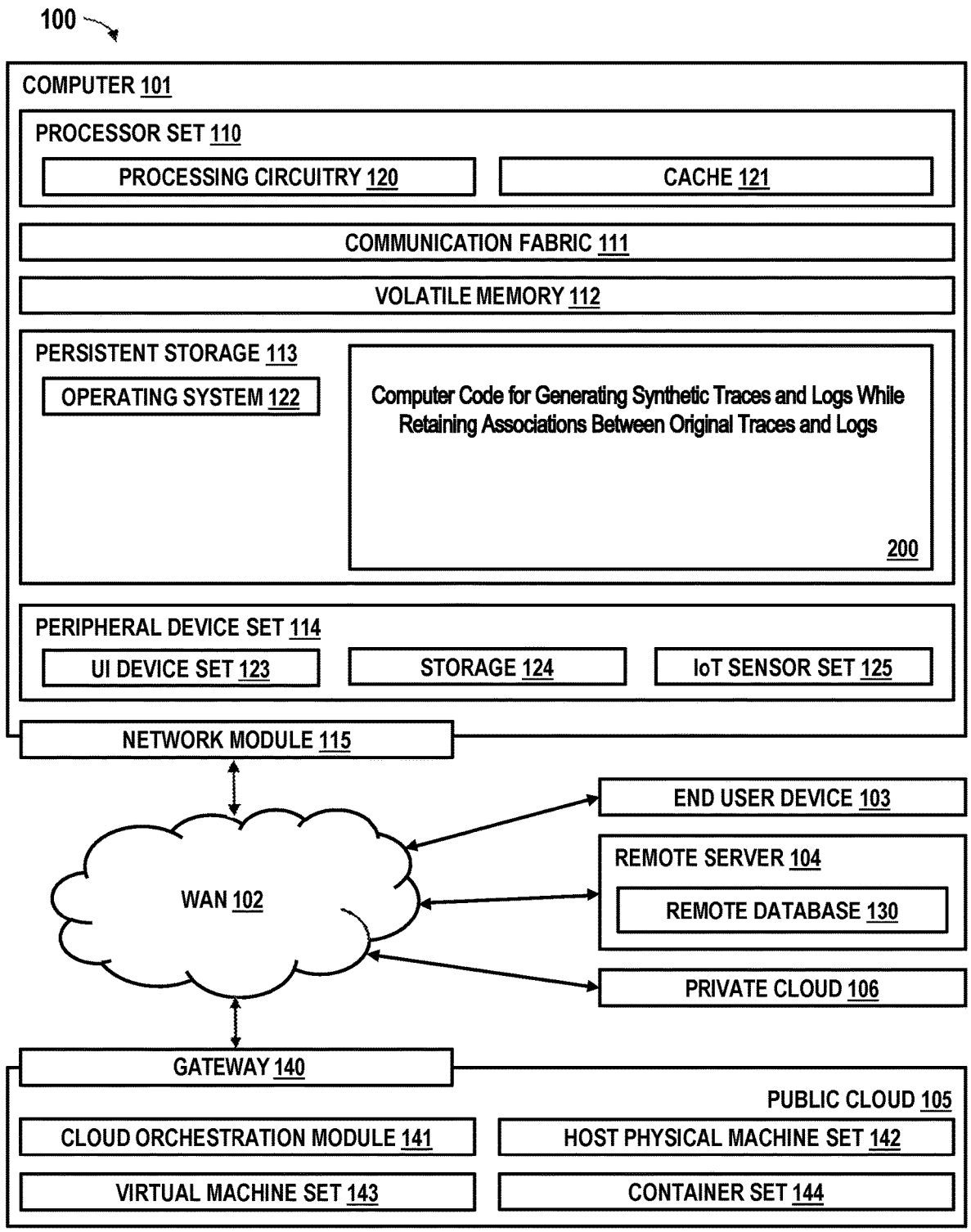
FIG. 21 illustrates an example computing environment utilized by some embodiments.

FIG. 21 illustrates an example computing environment 100 utilized by some embodiments. Computing environment 100 contains an example of an environment for the execution of at least some of generation of synthetic traces and logs while retaining associations between original traces and logs computer code 200 involved in performing the inventive methods. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method comprising:
    collecting, by a computing device, traces and logs from a system as a seed dataset;
    training, by the computing device, a plurality of conditional variational autoencoder (CVAE) models using the seed dataset for learning association between the traces and the logs; and
    generating, by the computing device, synthetic traces and logs using the plurality of CVAE models while retaining the association between the traces and the logs for the synthetic traces and logs.

2. The method of claim 1, further comprising:
    associating, by the computing device, logs with corresponding traces based on contextual information and timestamps for providing a comprehensive view on system behaviors.

3. The method of claim 1, further comprising:
    storing, by the computing device, the association between the logs and the traces upon the generation of the synthetic traces and logs for capturing characteristics of the seed dataset.

4. The method of claim 3, wherein the generated synthetic traces and logs retain specific anomalies and trace or log characteristics captured in the seed dataset during a monitoring phase.

5. The method of claim 1, further comprising:
    training, by the computing device, one particular CVAE model of the plurality of CVAE models with a trace category identification (ID) as an additional input to generate the synthetic traces conditioned on specified trace categories.

6. The method of claim 5, wherein the training of the plurality of CVAE models is performed on a per aggregated-service basis with a same trace category ID as the additional input.

7. The method of claim 1, further comprising:
using, by the computing device, a log segment including multiple log lines for a particular trace as input for training a particular model of the plurality of CVAE models such that a sequence of the multiple log lines and correlation are retained upon generating synthetic log lines.

8. A computer program product for generation of high quality synthetic observability data for a system, the computer program product comprising a computer readable storage medium having program instructions embodied therewith, the program instructions executable by a processor to cause the processor to:
collect traces and logs from a system as a seed dataset;
train a plurality of conditional variational autoencoder (CVAE) models using the seed dataset for learning association between the traces and the logs; and
generate synthetic traces and logs using the plurality of CVAE models while retaining the association between the traces and the logs for the synthetic traces and logs.

9. The computer program product of claim 8, wherein the program instructions executable by the processor further cause the processor to:
associate logs with corresponding traces based on contextual information and timestamps for providing a comprehensive view on system behaviors.

10. The computer program product of claim 8, wherein the program instructions executable by the processor further cause the processor to:
store the association between the logs and the traces upon the generation of the synthetic traces and logs for capturing characteristics of the seed dataset.

11. The computer program product of claim 10, wherein the generated synthetic traces and logs retain specific anomalies and trace or log characteristics captured in the seed dataset during a monitoring phase.

12. The computer program product of claim 8, wherein the program instructions executable by the processor further cause the processor to:
train one particular CVAE model of the plurality of CVAE models with a trace category identification (ID) as an additional input to generate the synthetic traces conditioned on specified trace categories.

13. The computer program product of claim 12, wherein the training of the plurality of CVAE models is performed on a per aggregated-service basis with a same trace category ID as the additional input.

14. The computer program product of claim 8, wherein the program instructions executable by the processor further cause the processor to:
use a log segment including multiple log lines for a particular trace as input for training a particular model of the plurality of CVAE models such that a sequence of the multiple log lines and correlation are retained upon generating synthetic log lines.

15. A system comprising:
a processor; and
a computer-readable storage medium communicatively coupled to the processor and storing program instructions which, when executed by the processor, cause the processor:
collect traces and logs from the system as a seed dataset;
train a plurality of conditional variational autoencoder (CVAE) models using the seed dataset for learning association between the traces and the logs; and
generate synthetic traces and logs using the plurality of CVAE models while retaining the association between the traces and the logs for the synthetic traces and logs.

16. The system of claim 15, wherein the processor is further configured to execute the program instructions to:
associate logs with corresponding traces based on contextual information and timestamps for providing a comprehensive view on system behaviors.

17. The system of claim 15, wherein the processor is further configured to execute the program instructions to:
store the association between the logs and the traces upon the generation of the synthetic traces and logs for capturing characteristics of the seed dataset, wherein the generated synthetic traces and logs retain specific anomalies and trace or log characteristics captured in the seed dataset during a monitoring phase.

18. The system of claim 17, wherein the processor is further configured to execute the program instructions to:
train one particular CVAE model of the plurality of CVAE models with a trace category identification (ID) as an additional input to generate the synthetic traces conditioned on specified trace categories.

19. The system of claim 18, wherein the training of the plurality of CVAE models is performed on a per aggregated-service basis with a same trace category ID as the additional input.

20. The system of claim 15, wherein the processor is further configured to execute the program instructions to:
use a log segment including multiple log lines for a particular trace as input for training a particular model of the plurality of CVAE models such that a sequence of the multiple log lines and correlation are retained upon generating synthetic log lines.

* * * * *